United States Patent
Koetter, Jr. et al.

(10) Patent No.: US 11,974,667 B2
(45) Date of Patent: May 7, 2024

(54) MODULAR STORAGE SYSTEM FOR BARRELS

(71) Applicant: Koetter-Rax, LLC, Floyds Knobs, IN (US)

(72) Inventors: Robert J. Koetter, Jr., Floyds Knobs, IN (US); Kenneth E. Koetter, Floyds Knobs, IN (US); Gerald T. Koetter, Floyds Knobs, IN (US); Raymond Todd Magner, New Salisbury, IN (US); Brian S. Keith, Charlestown, IN (US); Greg Schmidt, Louisville, KY (US); Anthony Ferrera, Crestwood, KY (US); Mark Duane Cooke, Salem, IN (US); Clark Gregory, Charlestown, IN (US); Darr Scott Thompson, Sellersburg, IN (US); Adam Ray, Lexington, KY (US)

(73) Assignee: Koetter-Rax, LLC, Floyds Knob, IN (US)

( * ) Notice: Subject to any disclaimer, the term of this patent is extended or adjusted under 35 U.S.C. 154(b) by 284 days.

(21) Appl. No.: 17/224,297

(22) Filed: Apr. 7, 2021

(65) Prior Publication Data
US 2021/0315379 A1    Oct. 14, 2021

Related U.S. Application Data

(60) Provisional application No. 63/006,781, filed on Apr. 8, 2020.

(51) Int. Cl.
*A47B 81/00* (2006.01)
*A47B 47/00* (2006.01)
(Continued)

(52) U.S. Cl.
CPC ........ *A47B 81/007* (2013.01); *A47B 47/0091* (2013.01); *A47B 47/047* (2013.01);
(Continued)

(58) Field of Classification Search
CPC . A47B 81/007; A47B 47/0091; A47B 47/047; A47B 2220/0002; B23P 19/04
See application file for complete search history.

(56) References Cited

U.S. PATENT DOCUMENTS 221,945 A * 11/1879 Stitzel .................. A47B 81/007
                                                211/85.22
232,569 A *  9/1880 Thoma ................. A47B 81/007
                                                211/85.22

(Continued)

FOREIGN PATENT DOCUMENTS

DE    9315767 U1 *  4/1994
EP    0953305 A1 * 11/1999
(Continued)

OTHER PUBLICATIONS

International Search Report and Written Opinion, PCT/US2021/0026150, dated Jul. 22, 2021.

*Primary Examiner* — Stanton L Krycinski
(74) *Attorney, Agent, or Firm* — Dentons Bingham Greenebaum LLP; Brian W. Chellgren; James C. Eaves, Jr.

(57) ABSTRACT

The present invention relates to a modular storage system for barrels. The modular storage system includes a base rick module, an aisle rick module, and an end rick module, whereby a plurality of each module type may be assembled to construct a rickhouse.

20 Claims, 14 Drawing Sheets

(51) Int. Cl.
*A47B 47/04* (2006.01)
*B23P 19/04* (2006.01)
*B23P 21/00* (2006.01)
*B25B 11/02* (2006.01)

(52) U.S. Cl.
CPC .............. *B23P 19/04* (2013.01); *B23P 21/004* (2013.01); *B25B 11/02* (2013.01); *A47B 47/045* (2013.01); *A47B 2220/0002* (2013.01)

(56) References Cited

U.S. PATENT DOCUMENTS

| | | | | |
|---|---|---|---|---|
| 244,662 | A * | 7/1881 | Pottinger | A47B 81/007 211/85.22 |
| 520,098 | A * | 5/1894 | Warner | A47B 81/007 211/85.22 |
| 840,696 | A * | 1/1907 | Heberling | A47B 47/027 182/228.4 |
| 1,220,450 | A * | 3/1917 | Pavey et al. | A47B 81/007 211/85.22 |
| 1,791,336 | A * | 2/1931 | Warshaw | A47B 81/007 211/85.22 |
| 1,921,222 | A * | 8/1933 | De Lamar | A47B 81/007 211/85.22 |
| 2,011,250 | A * | 8/1935 | Michel | A47B 81/007 211/85.22 |
| 2,072,699 | A | 3/1937 | Ansel | |
| 2,119,883 | A * | 6/1938 | Legler | A47B 81/007 366/239 |
| 2,406,937 | A * | 9/1946 | Zabriskie | A47B 81/007 52/39 |
| 2,986,284 | A * | 5/1961 | Colbert | B65D 19/10 211/134 |
| 3,048,245 | A | 8/1962 | Shewell | |
| 3,368,690 | A * | 2/1968 | Konstant | A47B 81/007 403/388 |
| 3,476,260 | A * | 11/1969 | Jay | A47B 81/007 211/85.18 |
| 3,557,966 | A * | 1/1971 | Skubic | A47B 81/007 211/24 |
| 4,056,196 | A * | 11/1977 | Brauning | A47B 57/54 403/264 |
| 4,391,377 | A * | 7/1983 | Ziaylek, Jr. | A47B 81/007 206/443 |
| 4,431,107 | A * | 2/1984 | Bergstrom | A47B 81/007 211/59.4 |
| 4,506,796 | A * | 3/1985 | Thompson | A47B 81/007 108/55.3 |
| 5,984,119 | A * | 11/1999 | Uhl | A47B 81/007 211/59.4 |
| 6,050,538 | A * | 4/2000 | Marrow | A47B 81/007 248/500 |
| 6,135,297 | A * | 10/2000 | DeShazo | A47B 81/007 211/74 |
| 6,290,074 | B1 * | 9/2001 | Syvuk | A47F 7/283 D7/619.1 |
| 6,360,903 | B1 * | 3/2002 | Flores | B65D 19/385 211/85.22 |
| 6,682,253 | B2 * | 1/2004 | Binna | A47B 57/26 52/653.2 |
| 8,235,224 | B2 * | 8/2012 | Scholz | A47B 47/027 211/23 |
| 8,955,700 | B2 * | 2/2015 | Barber | A47F 7/04 211/23 |
| 9,161,619 | B1 * | 10/2015 | Somers | A47B 47/0091 |
| 9,445,670 | B1 * | 9/2016 | Stiefel | H05K 5/0017 |
| 9,993,074 | B1 * | 6/2018 | Osecki | A47B 47/00 |
| 10,206,506 | B1 * | 2/2019 | Lai | A47B 96/1433 |
| 10,219,621 | B2 * | 3/2019 | Wilhelmsen | B65D 19/0097 |
| 10,512,326 | B2 * | 12/2019 | Reyes | A47B 47/02 |
| 10,765,029 | B2 * | 9/2020 | Bonenfant | H05K 7/1497 |
| 10,952,533 | B2 * | 3/2021 | Lert, Jr. | B65G 1/065 |
| 11,390,456 | B2 * | 7/2022 | Nall | C12H 1/22 |
| 2007/0068888 | A1 * | 3/2007 | Tombu | A47B 81/007 211/85.22 |
| 2009/0232593 | A1 * | 9/2009 | Wang | A47B 47/047 403/376 |
| 2012/0027558 | A1 * | 2/2012 | Weeden | B65G 1/02 211/23 |
| 2012/0267332 | A1 | 10/2012 | Mariani | |
| 2016/0081471 | A1 * | 3/2016 | Qian | A47F 7/28 414/800 |
| 2016/0113396 | A1 * | 4/2016 | Wilhelmsen | B65D 19/385 211/72 |
| 2017/0238710 | A1 * | 8/2017 | Tsai | A47B 57/34 |
| 2018/0142192 | A1 * | 5/2018 | Ingram, III | C12H 1/22 |
| 2020/0196758 | A1 * | 6/2020 | Segas | F16F 7/08 |
| 2020/0315350 | A1 * | 10/2020 | Segas | A47B 91/08 |
| 2020/0345136 | A1 * | 11/2020 | DeCarlo | E06B 3/76 |

FOREIGN PATENT DOCUMENTS

| | | | | |
|---|---|---|---|---|
| EP | 1036525 | A1 * | 9/2000 | ........ A47B 81/007 |
| EP | 1066772 | A1 * | 1/2001 | ........ A47B 81/007 |
| EP | 2210524 | A1 * | 7/2010 | ........ A47B 47/027 |
| FR | 485508 | A * | 1/1918 | |
| FR | 2525664 | A1 * | 10/1983 | |
| FR | 2801043 | A1 * | 5/2001 | ........ A47B 81/007 |
| FR | 3064643 | A1 * | 10/2018 | ........ A47B 81/007 |
| FR | 3092827 | A1 * | 8/2020 | |
| GB | 1184606 | A * | 3/1970 | |
| WO | WO-0243529 | A1 * | 6/2002 | ........ A47B 81/007 |
| WO | WO-2007141518 | A1 * | 12/2007 | ........ A47B 81/007 |
| WO | WO-2016077796 | A1 * | 5/2016 | |
| WO | WO-2018098368 | A1 * | 5/2018 | ........ A47B 81/007 |

* cited by examiner

MODULAR STORAGE SYSTEM FOR BARRELS

CROSS-REFERENCE TO RELATED APPLICATION

This application claims the benefit of priority to U.S. provisional patent application Ser. No. 63/006,781, filed Apr. 8, 2020, for MODULAR STORAGE SYSTEM FOR BARRELS, incorporated herein by reference.

FIELD

The present invention relates to a modular storage system for barrels. The modular storage system includes a base rick module, an aisle rick module, and an end rick module, whereby a plurality of each module type may be assembled to construct a rickhouse.

BACKGROUND

For hundreds of years, alcoholic beverages have been aged and stored in barrels. Barrels themselves are often stored in specially configured buildings, referred to as rickhouses. A typical rickhouse includes a plurality of "ricks," or racks that store lines of barrels on their sides, typically three barrels high. A rick may include multiple horizontally aligned barrel aisles, typically with a walkway for workers extending along at least one side of each aisle. Workers may move along the walkways, manually rolling barrels along the ricks. A typical rickhouse is several stories high, such that a four story rickhouse would include four stacked ricks, one per story, each rick holding three vertically stacked lines of barrels arranged on their sides in each of a plurality of barrel aisles. Each floor of a typical rickhouse includes an exit aisle extending parallel to the ricks and a center aisle extending perpendicular to the ricks, such that the exit aisle and center aisle intersect at the center of each floor, forming a cross-shape. The center aisle is typically wide enough to accommodate two barrels end-to-end and is used for transporting barrels between ricks or into and out from the rickhouse. In contrast, walkways extending along ricks are typically narrower and accommodate only single individuals. A framework formed of a plurality of ricks is typically enclosed within a pair of opposing side walls extending perpendicular to the ricks, a pair of opposing end walls extending parallel to the ricks, the end walls and side walls abutting each other at corners, and a roof atop the side walls and end walls.

A typical newly filled bourbon barrel contains about 53 gallons of liquid and weighs about 550 lbs. A large rickhouse may contain approximately 57,000 barrels, in which case the ricks are supporting approximately 15,675 tons of weight. As barrels are added, removed, or moved within a rickhouse, this weight may become unevenly distributed, creating stress on the ricks, causing the rickhouse to lean, and in some well-documented cases, collapse. The most common method of monitoring the lean in a rickhouse is to install a plumb bob in a central location in the rickhouse. Traditional rickhouse construction methods depend primarily on compression members and joints, meaning all elements are effectively 'leaning into' each other for support. Unbalanced loading of barrels causes certain members and joints to pull away from each other, resulting in movement and necessitating a plumb bob as means to monitor that movement. As the rickhouse leans, the vertically aligned plumb bob moves away from being vertically aligned with the rick. Workers may then strategically load, unload, or rearrange barrels within the rickhouse to reduce the lean, bringing the plumb bob back into vertical alignment with the rickhouse as the lean is removed.

The inventors of the present disclosure realized that improvements are needed in barrel storage, particularly in the construction of rickhouses. In addition to the structural issues discussed above, typical on site assembly of a rickhouse requires significant manpower to assemble thousands of individual joints cut by saw in the field and connected with fasteners. Certain preferred features of the present disclosure address these and other needs and provide other important advantages.

SUMMARY

A modular storage system for barrels allows for rapid on-site construction of rickhouses. The modular storage rack includes several modular ricks, each with barrel aisles and integrated walkways. Individual modules may be constructed and assembled at a manufacturing facility, then transported to a building site and set in place using cranes, greatly reducing the number of necessary on-site workers. The modular ricks may be arranged end-to-end to create longer barrel aisles, arranged side-by-side to form additional barrel aisles, and stacked vertically to form multiple stories of ricks. In some embodiments, the modular storage rack includes a base rick, an aisle rick for placement parallel and adjacent to an exit aisle and an end rick for placement parallel and adjacent to end walls of a rickhouse.

As opposed to traditional ricks, the disclosed modular barrel storage system addresses various loading conditions and uses joints and connections that resist the pull-away effect of traditional rickhouses, eliminating the need for a plumb bob. In addition, by installing walk boards integral to the modular ricks, field installers have a location to walk and stand while connecting modules together. Furthermore, use of standardized parts within modules and between modules reduces field measuring errors and other human errors.

The present invention is for a modular storage system for barrels with a plurality of modules, each module having a plurality of vertical post assemblies, each vertical post assembly having a bottom plate, the bottom plate having at least two posts attached thereto and extending upward therefrom, the at least two posts being in a parallel relationship, the at least two posts each having a pair of channels therein located from the top of each post extending downward, the channels located on opposite sides of each post, the channels in the at least two posts being in alignment such that the channel in one post and the channel in another post which channels face each other receive the ends of a portal herein; the plurality of vertical post assemblies being spaced apart with their bottom plates in a parallel relationship with at least one post of each vertical post assembly having at least one dunnage member secured thereto, thereby securing the parallel relationship of the plurality of vertical post assemblies and thereby forming a module.

Taught are 2, 3, and 4 post vertical post assemblies, or VPAs. For the 2 post VPA, each of the vertical post assemblies of each module includes a first and a second post, the at least one dunnage member is secured to the side of the first post of each of the plurality post assemblies facing away from the second post, the bottom plates of each of the plurality of vertical post assemblies being spaced an equal distance apart and having walk boards extending therealong between the first and second posts. Also, the at least one dunnage member secured to the first post of each of the plurality of vertical post assemblies facing away from the second post can comprise three dunnage members, the dunnage members being equally spaced from each other. Further, each module can include eight vertical post assemblies.

For the 3 post VPA, the plurality of vertical post assemblies of each module includes a first, second, and third post, the at least one dunnage member comprises at least one set of dunnage members, each set including one dunnage member secured to the outside of the first post of each of the plurality of vertical post assemblies facing away from the second and third posts, another dunnage member secured to the inside of the second post of the plurality of vertical post assemblies facing toward the third post, and another dunnage member secured to the inside of the third post of the plurality of vertical post assemblies facing toward the second post, the set of dunnage members being at the same height above the bottom plates, the bottom plates of each of the plurality of vertical post assemblies being spaced an equal distance apart and having walk boards therealong between the first and second posts. Also, the at least one set of dunnage members can comprise three sets of dunnage members, the sets of dunnage members being equally spaced from each other along the posts. Further, each module can include eight vertical post assemblies.

For the 4 post VPA, the plurality of post assemblies of each module includes a first, second, third, and fourth post, the at least one dunnage member comprises at least one set of dunnage members, each set including one dunnage member secured to the outside of the first post of each of the plurality of vertical post assemblies facing away from the second, third, and fourth posts, another dunnage member secured to the inside of the second post of the plurality of vertical post assemblies facing toward the third post, another dunnage member secured to the inside of the third post of the plurality of vertical post assemblies facing toward the second post, and another dunnage member secured to the outside of the fourth post of the plurality of vertical post assemblies facing away from the first, second, and third posts, the set of dunnage members being at the same height above the bottom plates, the bottom plates of each of the plurality of vertical post assemblies being spaced an equal distance apart and having walk boards extending therealong between the first and second posts and the third and fourth posts. Also, the at least one set of dunnage members can comprise three sets of dunnage members, the sets of dunnage members being equally spaced from each other along the posts. Further, each module can include eight vertical post assemblies.

In the 3 post VPA, it is preferable that the second and third posts and the three sets of dunnage members are spaced such that a barrel can fit between the second and third posts and be supported along its ends by cooperating dunnage members on the second and third posts. In the 4 post VPA, it is preferable that the second and third posts and the three sets of dunnage members are spaced such that a barrel can fit between the second and third posts and be supported along its ends by cooperating dunnage members on the second and third posts.

Using multiple modules with 4 post VPAs, where the plurality of modules includes at least a first module, a second module, and a third module, each module having a first, second, third, and fourth post, the first, second, and third modules being spaced near to each other with the vertical post assemblies of the three modules being linearly aligned, the spacing between the modules being such that a barrel can fit between the fourth post of the first module and the first post of the second module and be supported by cooperating dunnage members on these posts, the facing channels in these posts receiving the ends of a portal therein, the spacing between the modules further being such that a barrel can fit between the fourth post of the second module and the first post of the third module and be supported by cooperating dunnage members on these posts, the facing channels in these posts receiving the ends of a portal therein. For example, with this multiple module arrangement, each module can include eight vertical post assemblies.

Also, taught herein is placing 6 of the 4 post VPA modules together with a 2 post VPA module on one end and a 3 post VPA module on the other end, thereby forming a rick storage unit, all the 8 modules in a spaced relationship as described in the previous paragraph and further herein. This 8 module rick storage unit grouping can be replicated as 2-8 module units placed side by side with a center aisle therebetween, or 2-8 module units placed end to end with an aisle therebetween, or 4-8 module groups placed with a center aisle and a cross aisle between the 4-8 module groups. Further taught is placing an identical module or rick storage unit on top a module or rick storage unit to form an additional floor. In this configuration the bottom plate of the top VPA will fit directly on the tops of the posts and the portals of the VPA below. Additional floors can be added the same way. Other module arrangements are possible depending on the desired rickhouse layout.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this invention.

DETAILED DESCRIPTION OF THE ILLUSTRATED EMBODIMENTS

Figure 1:
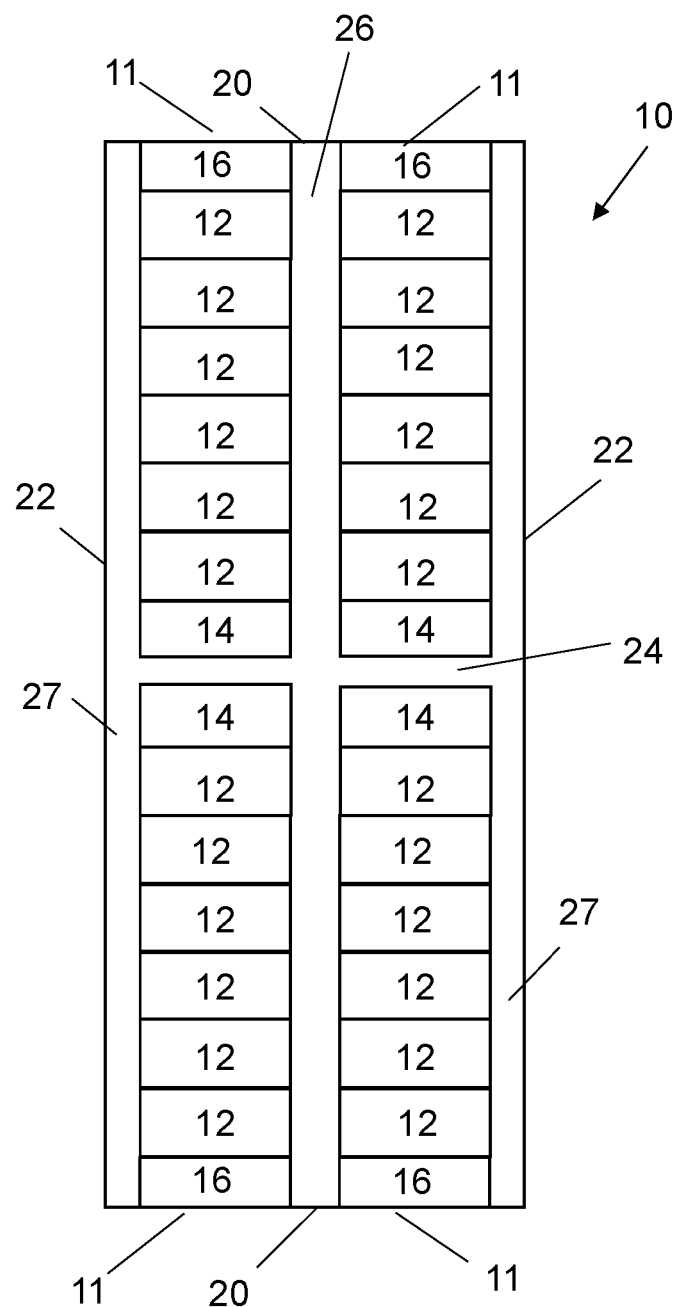
FIG. 1 is a schematic top plan view of a single floor of a rickhouse including the modular storage rack (not to scale).

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein; such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present invention include a modular barrel storage system. More specifically, the present invention includes a modular system for production and assembly of a rickhouse for barrel storage wherein each component of the module is sized to be transported by truck. In use, the modules may be manufactured at a production location, then transported and assembled into a rickhouse at an assembly location, either inside an existing structure, or walls and a roof may be built around the modular barrel storage system.

Referring to FIG. 1, in some embodiments, the modular barrel storage system 10 includes a base rick module 12, an aisle rick module 14, and an end rick module 16. The modular storage system 10 is enclosed within a pair of opposing end walls 20 and a pair of opposing side walls 22, and are spaced to form an exit aisle 24 and center aisle 26 therebetween. End rick modules 16 are located parallel to and form a portion of end walls 20. Aisle rick modules 14 are located parallel and adjacent to the exit aisles 24. The remainder of the modular storage system 10 is composed of base rick modules 12. The combination of an end module 16, six base rick modules 12, and an aisle module 14 is referred to as a rick storage unit 11. In typical use, the side walls 22 will be spaced apart from the rick modules 12, 14, 16 to form side aisles 27 between the ricks 12, 14, 16 and the side walls 22. As such, rick modules 12, 14, 16 are positioned such that the length of the rick modules 12, 14, 16 extend between the center aisle 26 and a side aisle 27.

In the depicted embodiment, the modular barrel storage system 10 is divided into quadrants by the perpendicularly extending exit aisle 24 and center aisle 26. Each quadrant includes an end rick module 16 which forms a portion of the end wall 20, an aisle rick module 14 extending adjacent to the exit aisle 24, and six base rick modules 12 extending between a side wall 22 and the center aisle 26, the base rick modules 12 being joined side to side in a spaced parallel relationship between the end rick module 16 and aisle rick module 14. This layout may be vertically stacked, creating multiple floors. It should be understood that this modular storage system 10 can be arranged in a variety of ways, including, but not limited to, modules being aligned end to end, greater or fewer numbers of base rick modules aligned side by side per quadrant, the length of rick modules being lengthened or shortened by adding or removing VPAs, as described below, and otherwise, as will be understood by one skilled in the art.

Base Rick Module

Referring now to FIGS. 2A through 5, a base rick module 12 includes a bottom plate 28 and four posts 30 extending vertically upwards therefrom. As most readily seen in FIG. 2A, a first walkway 32 is defined between the two posts 30 designated A and B, a barrel aisle 34 is defined between the two posts 30 designated B and C, and a second walkway 36 is defined between the two posts 30 designated C and D. The first and second walkways 32, 36 provide space for workers (e.g., barrel rollers) to move alongside the barrel aisle 34 and roll barrels 38 located within the barrel aisle 34.

Figure 2A:
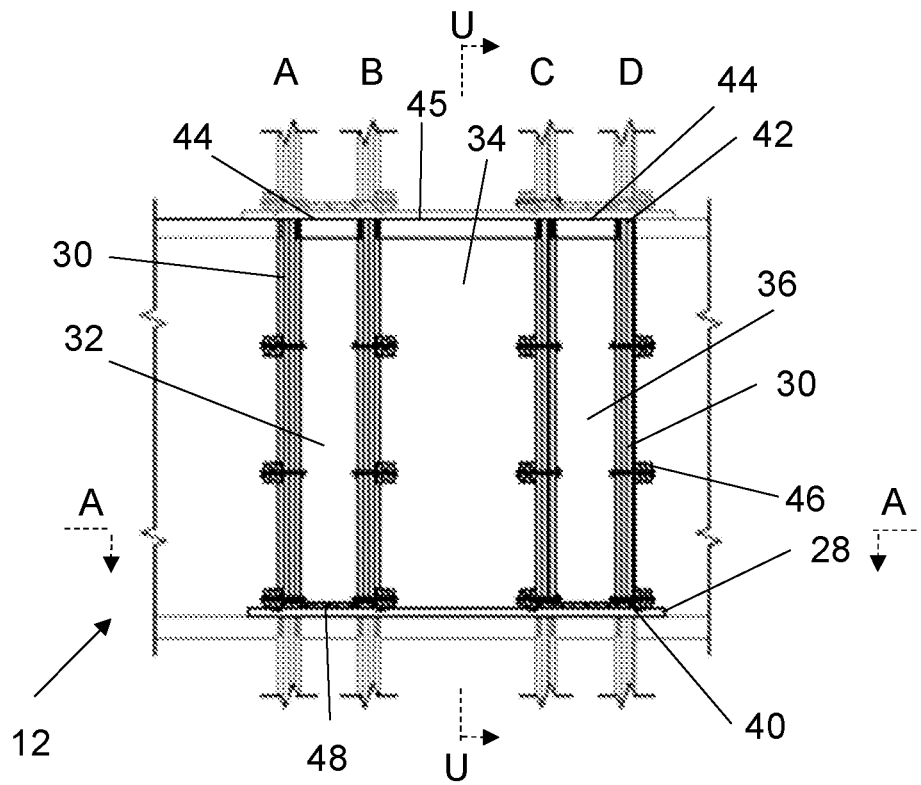
FIG. 2A depicts an end elevation view of the base rick module.
Figure 2B:
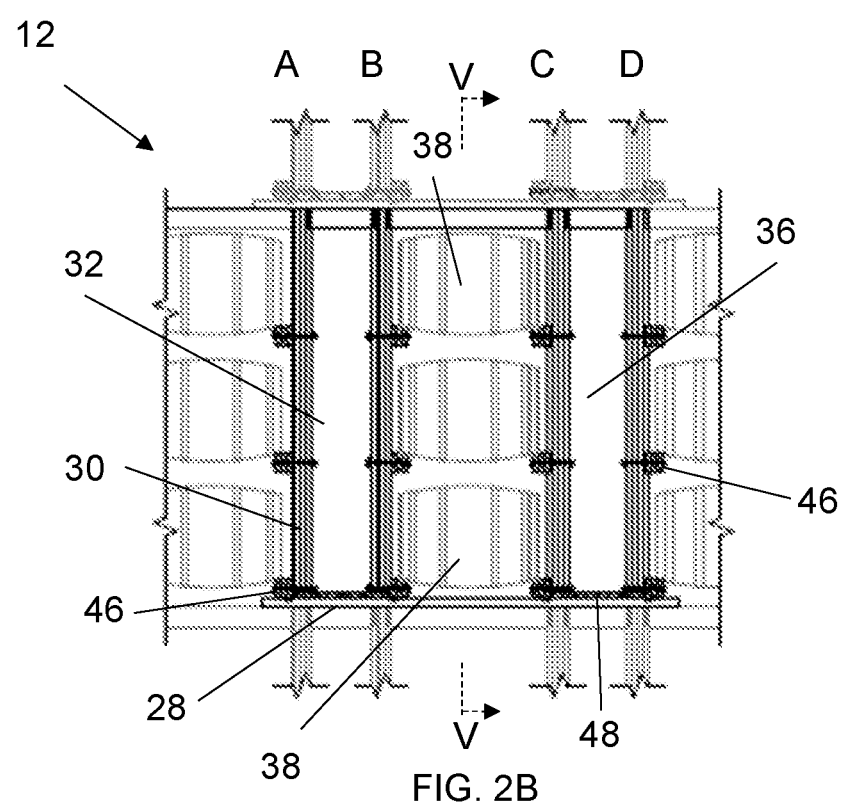
FIG. 2B depicts the end elevation view of the base rick module of FIG. 2A with barrels shown.

Each post 30 includes a bottom end 40 and a top end 42 opposite the bottom end 40. The bottom end 40 engages the bottom plate 28. A series of portals 44, 45 extend between the top ends 42 of adjacent posts 30 to provide additional stability. As shown in FIGS. 2A and 2B, the spacing between posts B and C is greater than the spacing between posts A and B, and between posts C and D. Corresponding, the width of the portals 45 extending between posts B and C is greater than the width of the portals 44 extending between posts A and B, and between posts C and D.

Referring to the perspective shown in FIG. 2B, multiple base rick modules 12 may be positioned in a spaced side by side parallel relationship to cooperatively form additional barrel aisles, whereby a barrel aisle is cooperatively defined between post A of the base rick module 12 and post D (not shown) of another base rick module 12 positioned to the left of the depicted module 12. Another barrel aisle is cooperatively defined between post D of the base rick module 12 and post A (not shown) of another base rick module positioned to the right of the depicted module 12. In addition, base rick modules 12 may be stacked atop each other such that the bottom plate 28 of one base rick module 12 rests atop the portals 44, 45 and top ends 42 of the posts 30 of a lower base rick module 12.

In one embodiment, each post 30 is 4⅞" wide×6⅞" long×7'10" high. In this embodiment, the bottom plate 28 is 1¾" high×6⅞" wide×8'6" long. This bottom plate 28 has four cavities (not shown) routed out ⅛" deep by 4⅞" wide, each to receive a vertical post 30. The bottom plate 28 also has a ¾" wide by ¾ deep slot (not visible) routed in along the centerline of the plate 28, the slot extending along substantially the entire length of the bottom plate 28 to receive a ¾" wide by ¾" high projection (not shown) extending from the bottom end 40 of each post 30. This allows the posts 30 to be centered at each of the four cavities and mechanically engage the bottom plate 28. In some embodiments, bottom plates 28 and posts 30 are formed of dense Southern yellow pine, except for bottom plates 28 intended for use on the 1st floor of a rickhouse, which are formed of solid white oak. In other embodiments, other woods or other non-wood materials may be used to form the bottom plate 28.

In some embodiments, the two portals 44 sized to fit between posts A and B and between posts C and D (i.e., walkway portals) are 14" long×4⅞" wide×6⅞" high, with a tapered tenon on each end and a tapered mortise centered on one side of the portal 44. The portal 45 sized to fit between posts B and C (i.e., barrel aisle portal) is 37" long×4⅞" wide×6⅞" high, with a tapered tenon on each end. In some embodiments, barrel aisle portal 45 includes an arched curve along its length for aesthetics.

The tapered tenons on the walkway portals 44 and barrel aisle portal 45 and the tapered mortise on the walkway portals 44 are used to interconnect components of the modular storage system 10. Posts 30 are formed with corresponding tapered mortises or channels from the top of each post downward on each of their sides to receive the tapered tenons of the ends corresponding portals 44. For example, and referring to the perspective shown in FIG. 2A, the tapered mortise on the right side of post A receives the tapered tenon from the adjacent walkway portal 44 extending between posts A and B, while the tapered mortise on the left side of post A receives the tapered tenon from the adjacent barrel aisle portal 45 extending between post A and post D of the base rick module positioned to the left of the depicted base rick module 12. The tapered mortise on the side of the walkway portal 44 is used to join the base module 12 with a corresponding base module 12 across the center aisle 26. A tie beam (not shown) having tapered tenons on each end extends across the center aisle 26, engaging the corresponding tapered mortises or channels on opposing walkway portals 44, to mechanically engage the modules 12 and provide support for the flooring of the center aisle in the floor above.

In certain embodiments, the top of portal 45 includes a centered alignment hole and bottom plate 28 includes a corresponding centered alignment hole. When two base modules 12 are stacked atop each other, a worker may insert a rod through both alignment holes to confirm that the modules are aligned, before affixing the modules together using fasteners.

Figure 3A:
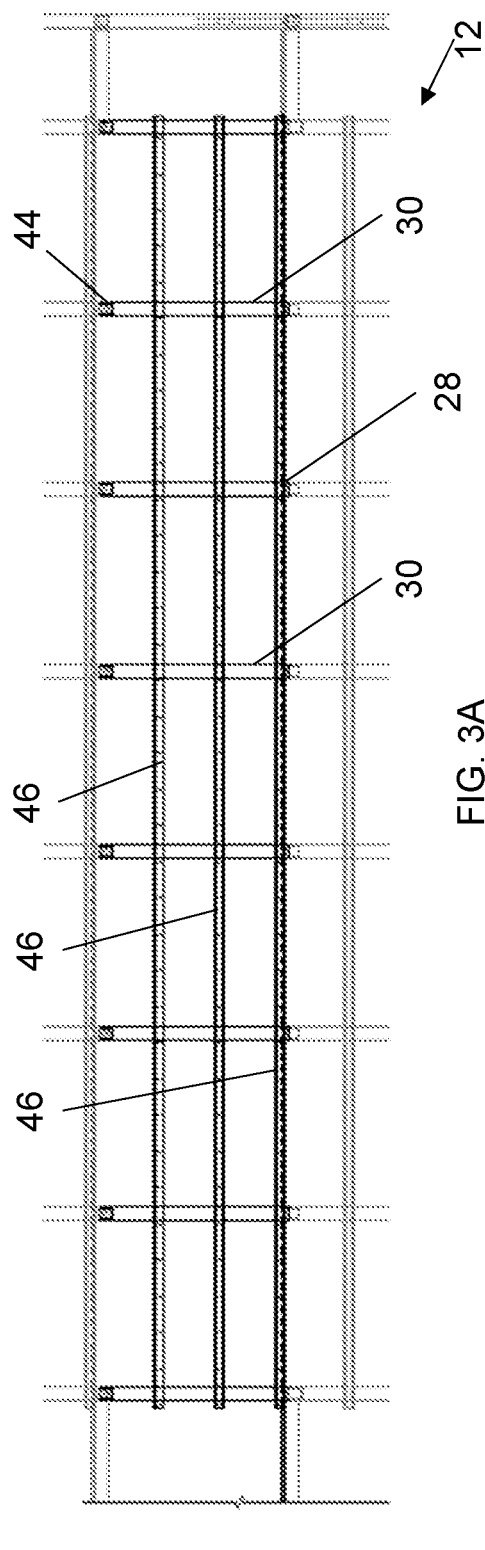
FIG. 3A depicts a side elevation view of the base rick module along line U-U of FIG. 2A.
Figure 3B:
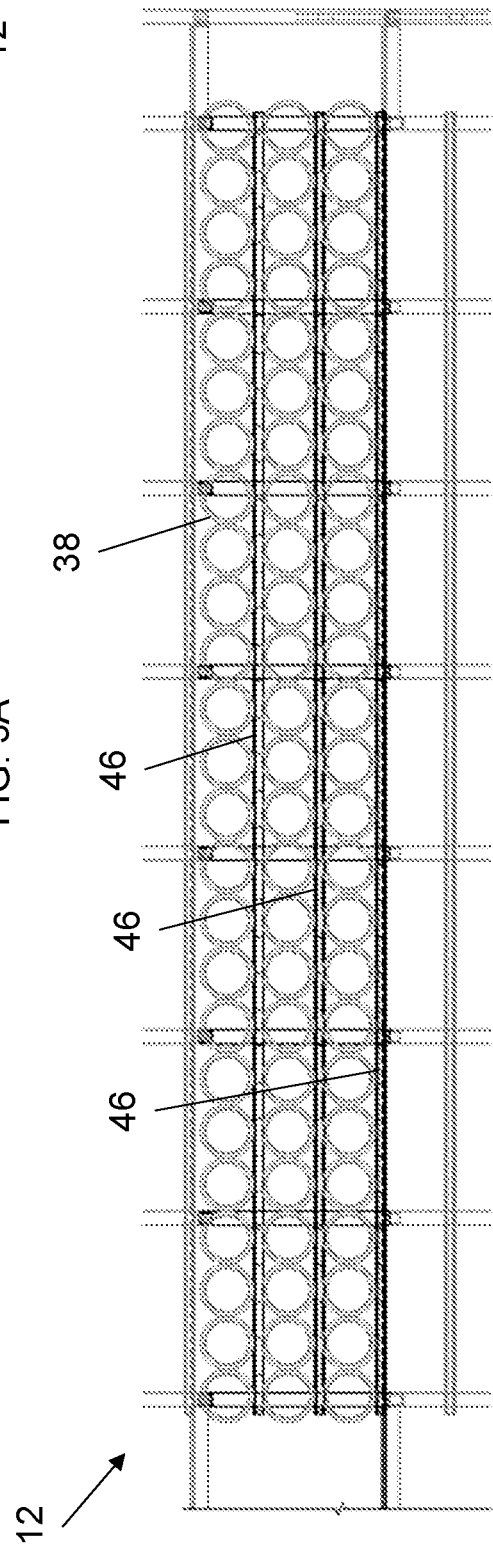
FIG. 3B depicts a side elevation view of the base rick module along line V-V of FIG. 2B.
Figure 5:
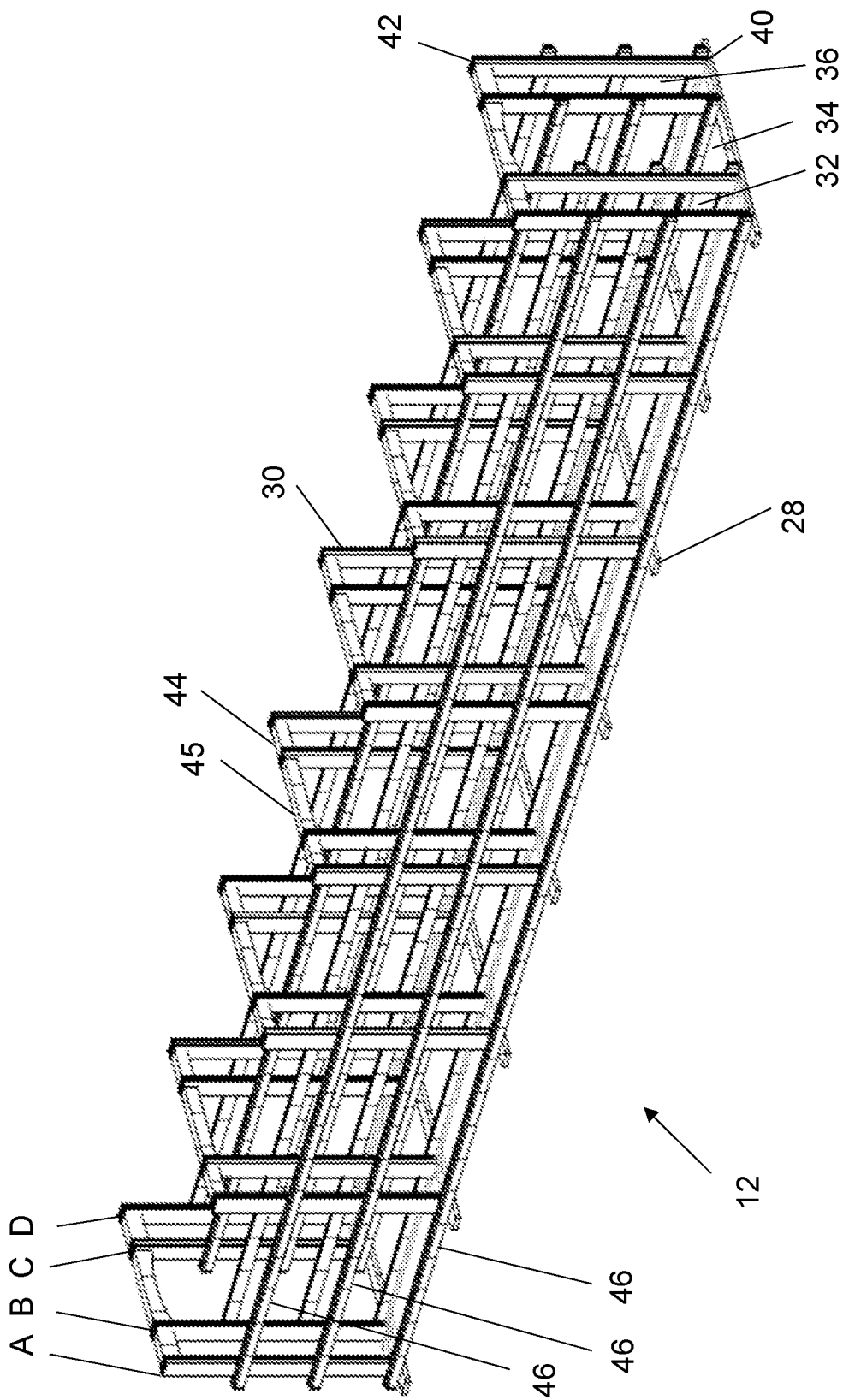
FIG. 5 depicts an isometric view of the base rick module.

As most readily seen in FIGS. 3A, 3B, and 5 the base rick module 12 includes a plurality of the bottom plate and four post configurations shown in FIGS. 2A and 2B, collectively referred to as a four post vertical post assembly or 4-VPA. In the depicted embodiment, the base rick module 12 includes eight 4-VPAs spaced 90" apart, although different embodiments may have different spacing or a different number of 4-VPAs in a base rick module 12. The spaced apart 4-VPAs are connected by horizontal beams configured to support barrels, generally referred to in the industry as dunnage 46. As shown in FIGS. 2A and 2B, dunnage 46 is affixed to the left sides of posts A and C and affixed to the right sides of posts B and D. This arrangement provides for unobstructed walkways 36 between posts A and B and between posts C and D, while the dunnage 46 supports barrels 38 between posts B and C. This arrangement also provides for supporting barrels 38 between post A and post D of a second base rick module positioned to the left of the base rick module 12 shown in FIG. 2B, and between post D and post A of a third base rick module positioned to the right of the base rick module 12 shown in FIG. 2B. In the depicted embodiment, three lengths of dunnage 46 are attached to each post 30 at three different heights, allowing for three rows of barrels 38 to be supported by the posts 30. In preferred embodiments, the dunnage 46 is tapered on both its top and bottom surfaces to substantially match the taper of barrels 38 that will be rolled along and supported by the dunnage 46. In the event of damage to the top surface, the dunnage 46 may be removed from the posts 30, rotated upside down, and reattached to the posts 30, using the undamaged bottom surface as the top surface in this new orientation.

In some embodiments, holes are pre-drilled in posts 30 at the desired height of the dunnage 46. In certain embodiments, the dunnage 46 is 4⅜" wide×5" high×53.5' long. In addition, a ¼" deep recess is formed in each post 30 to receive a portion of the dunnage 46. The dunnage 46 is predrilled every 90" to match locations of the spaced apart 4-VPAs. The dunnage 46 is then inserted into the respective recesses, aligning the predrilled holes in the dunnage 46 with the pre-drilled holes in the posts 30, and bolts are inserted through the posts 30 and dunnage 46 to fasten them together.

Figure 4:
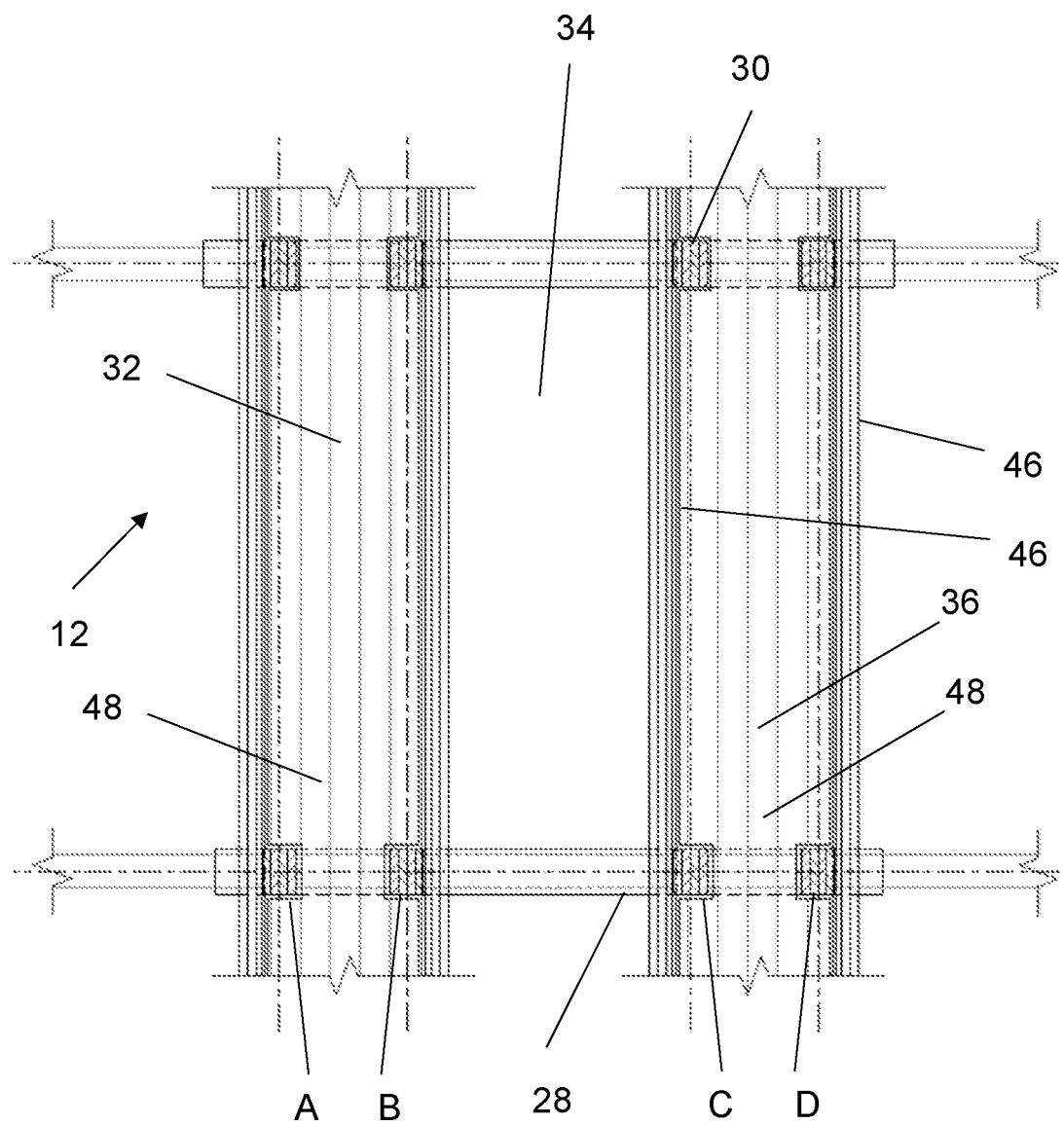
FIG. 4 depicts a sectional top plan view of the base rick module along line A-A of FIG. 2A.

As most readily seen in FIG. 4, base rick module 12 further includes walk boards 48 extending between successive bottom plates 28 in successive 4-VPAs between posts A and B, and between posts C and D (walk boards 48 are omitted from FIG. 5 for clarity). Walk boards 48 provide footing for workers along substantially the entire length of the base rick module 12. In some embodiments, each individual walk board 48 is approximately 90" in length and is fastened to successive bottom plates 28 by screws or other means as generally known in the art. Base rick module 12 designed for use on a second or higher story additionally includes fall protection cages (not shown). In some embodiments, fall protection cages are wire mesh installed between posts B and C at the 4-VPAs on either end of the base rick module 12. The fall protection cages serve to catch workers who fall off center aisle 26 and side aisles 27.

In some embodiments, a base rick module 12 with eight 4-VPAs, as shown in FIG. 5, is 8' 6" wide, 7' 11" tall and 53' 6" long. The base rick module 12 is sized to be loaded on a flatbed trailer and transported to a construction site, and may be lifted by crane and set into place on a flooring or atop another base rick module. It should be understood that base rick modules 12 may be constructed with fewer than eight 4-VPAs.

In some embodiments, alternative support versions of the base rick module 12 may be incorporated into a modular storage system 10. These support versions (not shown) include cross-bracing supports forming X-patterns extending along the barrel aisle 34 from the top end 42 of post C to the bottom end 40 of post D, from the bottom end 40 of post C to the top end 42 of post D, from the top end 42 of post D to the bottom end 40 of post C, or from the bottom end 40 of post D to the top end 42 of post C. Optionally, every 3$^{rd}$, 4$^{th}$, 5$^{th}$, 6$^{th}$, or other number of base rick module 12 may be a support base rick module, as necessary for the structural stability of the rickhouse. For example, a five story rickhouse may require greater bracing and utilize a greater proportion of support base rick modules than a two story rickhouse.

Aisle Rick Module

Referring now to FIGS. 6A through 9, an aisle rick module 14 is generally similar to base rick module 12, but lacks a post D. Aisle rick module 14 includes a bottom plate 128 and three posts 130 extending vertically upwards therefrom. As most readily seen in FIG. 3A, a first walkway 132 is defined between the two posts 30 designated A and B and a barrel aisle 134 is defined between the two posts 130 designated B and C. The first walkway 132 provide space for workers (e.g., barrel rollers) to move alongside the barrel aisle 134 and roll barrels 38 located within the barrel aisle 134. The exit aisle 24 is located to the right of post C, providing space for workers to move alongside the side of the barrel aisle 134 opposite the first walkway 132. Exit aisle 24 also provides a route for workers to exit the rickhouse in an emergency.

Each post 130 includes a bottom end 140 and a top end 142 opposite the bottom end 40. The bottom end 140 engages the bottom plate 128. A series of portals 144, 145 extend between the top ends 142 of adjacent posts 30 to provide additional stability. As shown in FIGS. 5A and 5B, the spacing between posts B and C is greater than the spacing between posts A and B. Corresponding, the width of the portal 145 extending between posts B and C is greater than the width of the portal 144 extending between posts A and B.

Figure 6A:
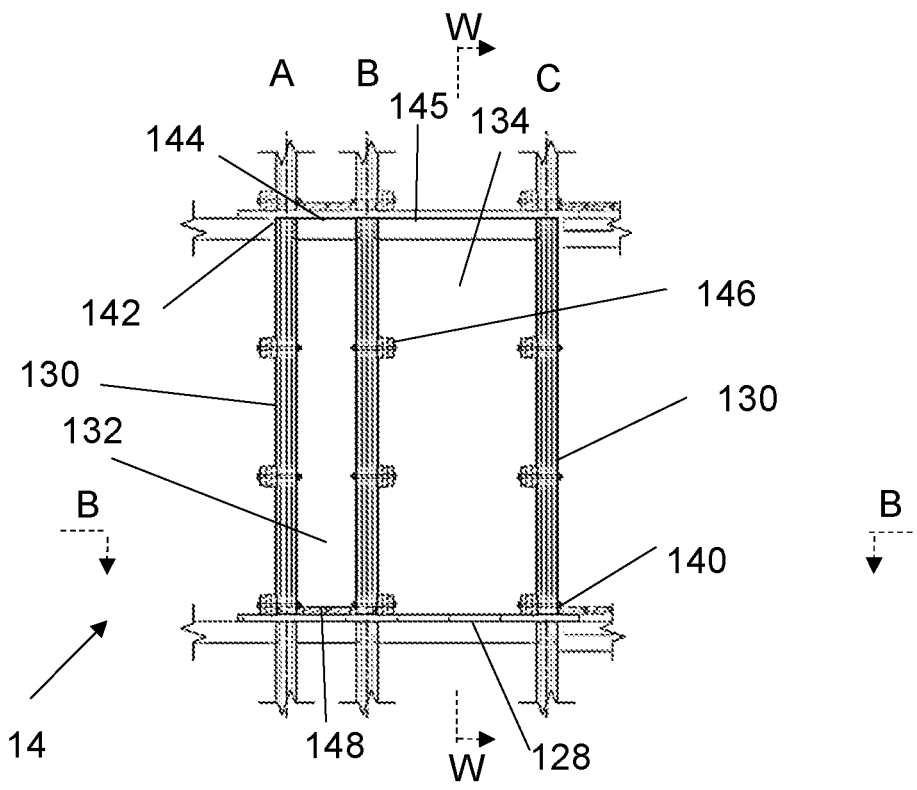
FIG. 6A depicts an end view of the aisle rick module.
Figure 6B:
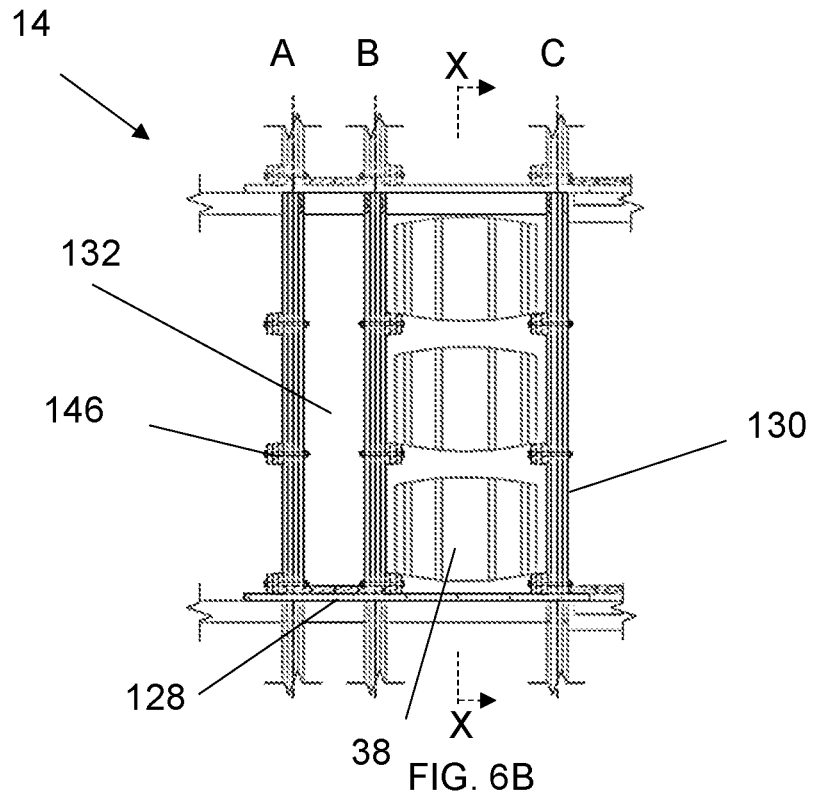
FIG. 6B depicts the end view of the aisle rick module of FIG. 6A with barrels shown.

Referring to the perspective shown in FIG. 6B, aisle rick module 14 may be positioned alongside a base rick module 12 to cooperatively form an additional barrel aisle, whereby a barrel aisle is cooperatively defined between post A of the aisle rick module 14 and post D (not shown) of a base rick module 12 positioned to the left of the depicted aisle rick module 14. In addition, aisle rick modules 14 may be stacked atop each other such that the bottom plate 128 of one aisle rick module 14 rests atop the portals 144 and top ends 142 of the posts of a lower aisle rick module 14.

In one embodiment, each post 130 is 4⅞" wide×6⅞" long×7'10" high. In this embodiment, the bottom plate 128 is 1¾" high×6⅞" wide×6' 7⁹⁄₁₆" long. This bottom plate 128 has three cavities (not shown) routed out ⅛" deep by 4⅞" wide, each to receive a vertical post 130. The bottom plate 128 also has a ¾" wide by ¾" deep slot (not visible) routed in along the centerline of the plate 128, the slot extending along substantially the entire length of the bottom plate 128 to receive a ¾" wide by ¾" high projection (not shown) extending from the bottom end 140 of each post 130. This allows the posts 130 to be centered at each of the three cavities and mechanically engage the bottom plate 128. In some embodiments, bottom plates 128 and posts 130 are formed of dense Southern yellow pine, except for bottom plates 128 intended for use on the 1st floor of a rickhouse, which are formed of solid white oak. In other embodiments, other woods or other non-wood materials may be used to form the bottom plate 128.

In some embodiments, the walkway portal 144 sized to fit between posts A and B is 14" long×4⅞" wide×6⅞" high, with a tapered tenon on each end and a tapered mortise centered on one side of the portal 144. The barrel aisle portal 145 sized to fit between posts B and C is 37" long×4⅞" wide×6⅞" high, with a tapered tenon on each end. In some embodiments, barrel aisle portal 145 includes an arched curve along its length for aesthetics. Posts 130 are formed with corresponding tapered mortises on their sides to receive the tapered tenons of the ends corresponding portals 144, 145. For example, and referring to the perspective shown in FIG. 6A, the tapered mortise on the right side of post A receives the tapered tenon from the adjacent walkway portal 144 extending between posts A and B, while the tapered mortise on the left side of post A receives the tapered tenon from the adjacent barrel aisle portal 145 extending between post A and post D of the base rick module positioned to the left of the depicted aisle rick module 14. The tapered mortise on the side of the walkway portal 144 is used to join the aisle module 14 with a corresponding aisle module 14 across the center aisle 26 using a tie beam (not shown) in the manner described above in connection with the base module 12.

In certain embodiments, the top of portal 145 includes a centered alignment hole and bottom plate 128 includes a corresponding centered alignment hole. When aisle rick modules 14 are stacked atop each other, a worker may insert a rod through both alignment holes to confirm that the modules are aligned, before affixing the modules together using fasteners.

Figure 7A:
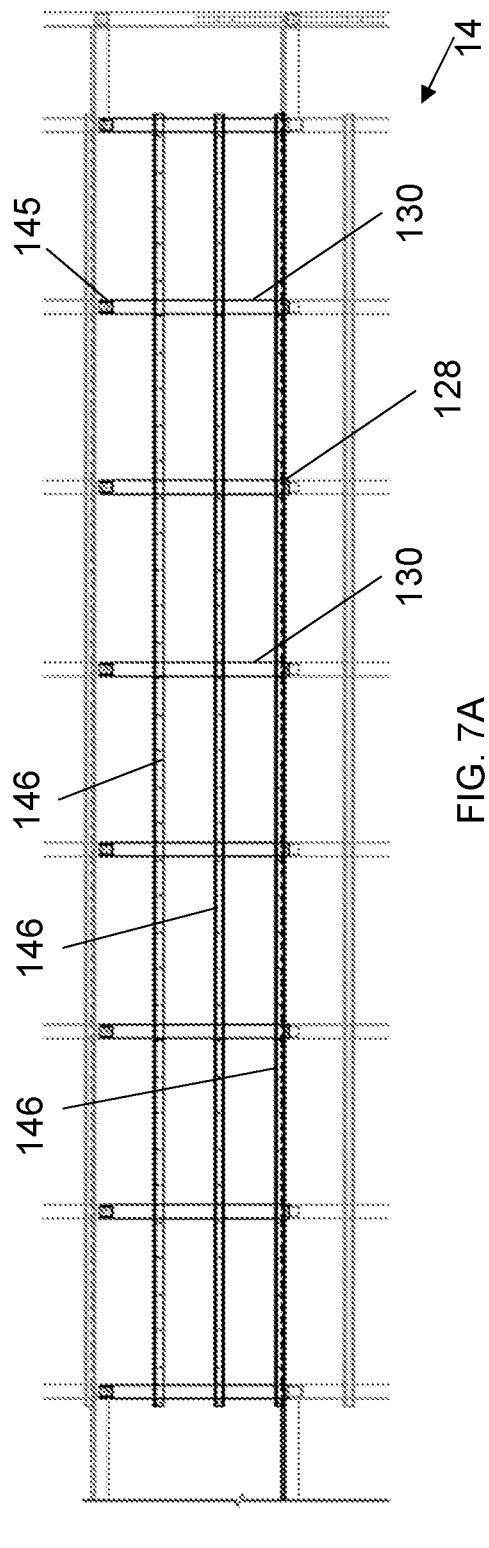
FIG. 7A depicts a side elevation view of the aisle rick module along line W-W of FIG. 6A.
Figure 7B:
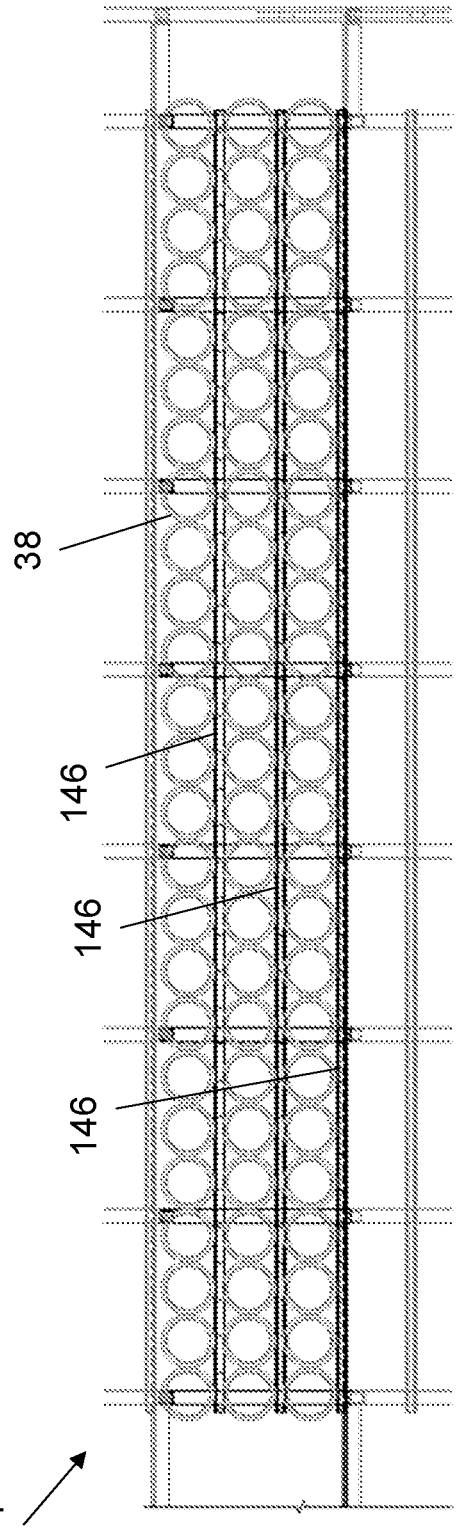
FIG. 7B depicts a side elevation view of the aisle rick module along line X-X of FIG. 6B.
Figure 9:
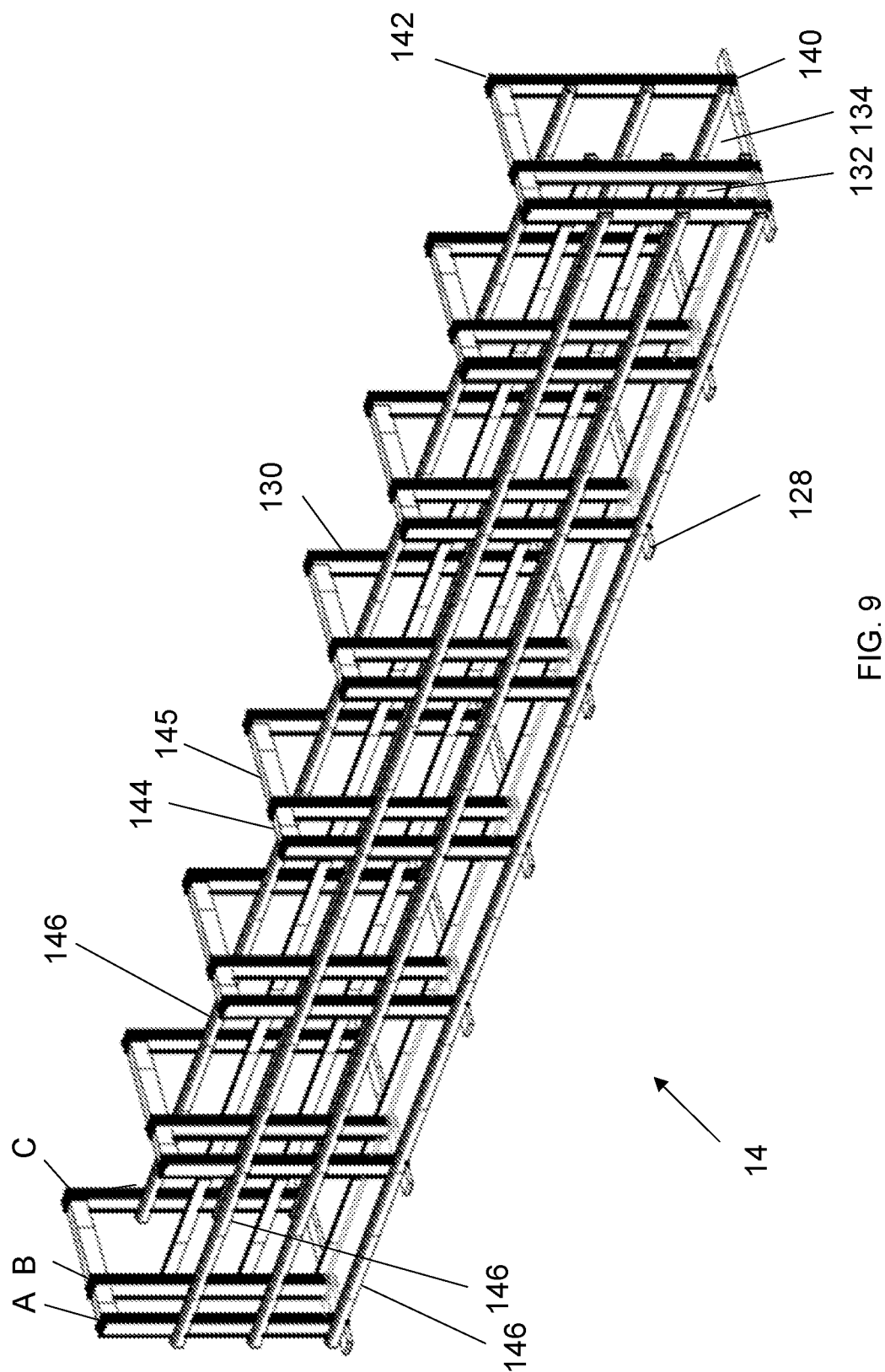
FIG. 9 depicts an isometric view of the aisle rick module.

As most readily seen in FIGS. 7A, 7B, and 9, the aisle rick module 14 includes a plurality of the bottom plate 128 and three post 130 configurations shown in FIGS. 6A and 6B, collectively referred to as a three post vertical post assembly or 3-VPA. In the depicted embodiment, the aisle rick module 14 includes eight 3-VPAs spaced 90" apart, although different embodiments may have different spacing or a different number of 3-VPAs in an aisle rick module 14. The spaced apart 3-VPAs are connected by dunnage 146. As shown in FIGS. 6A and 6B, dunnage 146 is affixed to the left sides of posts A and C and affixed to the right side of post B. This arrangement provides for an unobstructed walkway 136 between posts A and B while the dunnage 146 supports barrels 38 between posts B and C. This arrangement also provides for supporting barrels 38 between post A and post D of an adjacent base rick module positioned to the left of the aisle rick module 14 shown in FIG. 6B. In the depicted embodiment, three lengths of dunnage 146 are attached to each post 130 at three different heights, allowing for three rows of barrels 38 to be supported by the posts 130. In preferred embodiments, the dunnage 146 is tapered on both its top and bottom surfaces to substantially match the taper of barrels 38 that will be rolled along and supported by the dunnage 146. In the event of damage to the top surface, the dunnage 146 may be removed from the posts 130, rotated upside down, and reattached to the posts 130, using the undamaged bottom surface as the top surface in this new orientation.

In some embodiments, holes are pre-drilled in posts 130 at the desired height of the dunnage 146. In certain embodiments, the dunnage 146 is 4⅜" wide×5" high×53.5' long. In addition, a ¼" deep recess is formed in each post 130 to receive a portion of the dunnage 146. The dunnage 146 is predrilled every 90" to match locations of the spaced apart 3-VPAs. The dunnage 146 is then inserted into the respect recesses, aligning the predrilled holes in the dunnage 146 with the pre-drilled holes in the posts 130, and bolts are inserted through the posts 130 and dunnage 146 to fasten them together.

Figure 8:
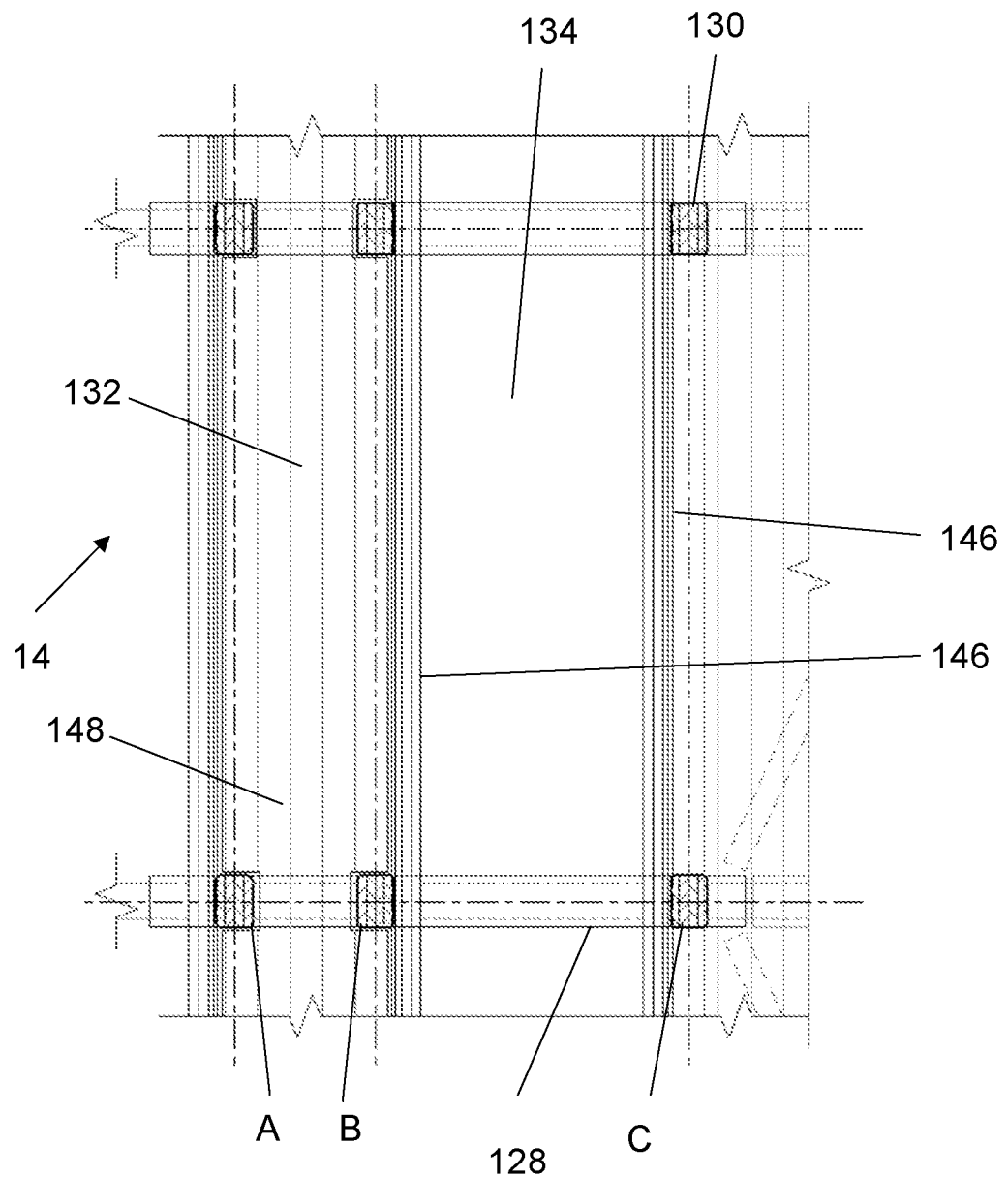
FIG. 8 depicts a cross-sectional top plan view of a portion of the aisle rick module along line B-B of FIG. 6A.

As most readily seen in FIG. 8, aisle rick module 14 further includes walk boards 148 extending between successive bottom plates 128 in successive 3-VPAs between posts A and B (walk boards 148 are omitted from FIG. 5 for clarity). Walk boards 148 provide footing for workers along substantially the entire length of the aisle rick module 14. In some embodiments, each individual walk board 148 is approximately 90" in length and is fastened to successive bottom plates 128 by screws or other means as generally known in the art. Aisle rick modules 14 designed for use on a second or higher story additionally includes fall protection cages (not shown). In some embodiments, fall protection cages are wire mesh installed between posts B and C at the 3-VPAs on either end of the aisle rick module 14. The fall protection cages serve to catch workers who fall off the center aisle 26 or side aisles 27.

In some embodiments, an aisle rick module 14 with eight 3-VPAs, as shown in FIG. 9, is 7' 6-9/16" wide, 7' 11" tall and 53' 6" long. The aisle rick module 14 is sized to be loaded on a flatbed trailer and transported to a construction site, and may be lifted by crane and set into place on a flooring or atop another aisle rick module. It should be understood that aisle rick modules 14 may be constructed with fewer than eight 3-VPAs.

End Rick Module

Referring now to FIGS. 10A through 13, an end rick module 16 is generally similar to base rick module 12, but lacks posts C and D. End rick module 16 includes a bottom plate 228 and two posts 230 extending vertically upwards therefrom. As most readily seen in FIG. 10A, a first walkway 232 is defined between the two posts 230 designated A and B. Post B forms a portion of the structural support of end wall 20. The first walkways 232 of the end rick modules 16 provide space for workers to walk alongside the end walls 20.

Each post 230 includes a bottom end 240 and a top end 242 opposite the bottom end 240. The bottom end 240 engages the bottom plate 228. A walkway portal 244 extend between the top ends 242 of adjacent posts 230 to provide additional stability.

Figure 10A:
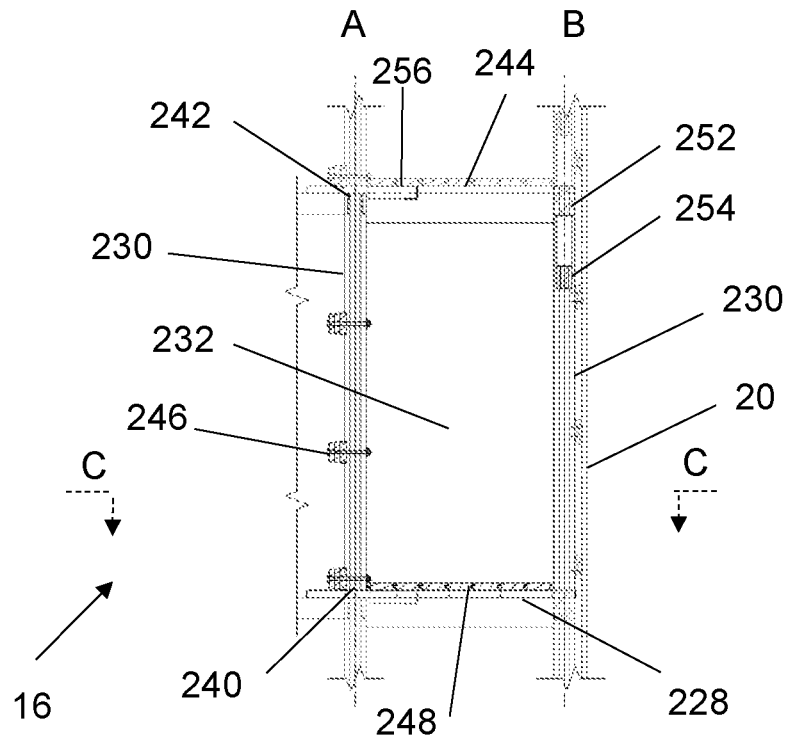
FIG. 10A depicts an end view of the end rick module.
Figure 10B:
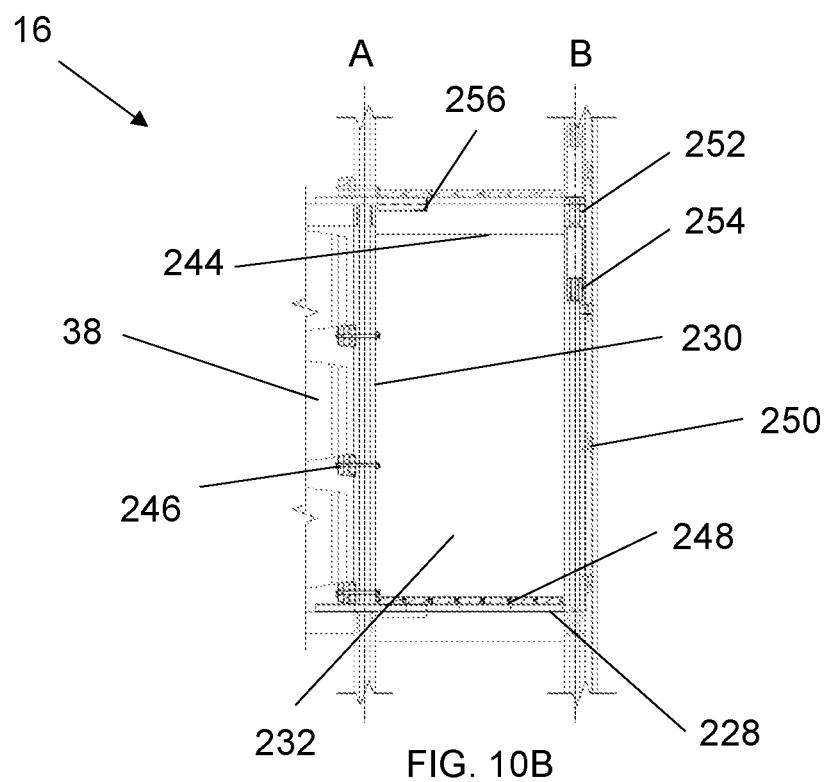
FIG. 10B depicts the end view of the end rick module of FIG. 10A with barrels shown.

Referring to the perspective shown in FIG. 10B, end rick module 16 may be positioned alongside a base rick module 12 to cooperatively form an additional barrel aisle, whereby a barrel aisle is cooperatively defined between post A of the end rick module 16 and post D (not shown) of a base rick module 12 positioned to the left of the depicted end rick module 16. In addition, end rick modules 16 may be stacked atop each other such that the bottom plate 228 of one end rick module 16 rests atop the portal 244 and top ends 242 of the posts of a lower end rick module 16.

In one embodiment, each post 230 is 4⅞" wide×6⅞" long×7'10" high. In this embodiment, the bottom plate 228 is 1¾" high×6⅞" wide×5' 2½" long. This bottom plate 228 has two cavities (not shown) routed out ⅛" deep by 4⅞" wide, each to receive a vertical post 230. The bottom plate 228 also has a ¾" wide by ¾" deep slot (not visible) routed in along the centerline of the plate 228, the slot extending along substantially the entire length of the bottom plate 228 to receive a ¾" wide by ¾" high projection (not shown) extending from the bottom end 240 of each post 230. This allows the posts 230 to be centered at each of the two cavities and mechanically engage the bottom plate 228. In some embodiments, bottom plates 228 and posts 230 are formed of dense Southern yellow pine, except for bottom plates 228 intended for use on the 1$^{st}$ floor of a rickhouse, which are formed of solid white oak. In other embodiments, other woods or other non-wood materials may be used to form the bottom plate 228.

In some embodiments, the walkway portal 244 sized to fit between posts A and B is 3' 7¾" long×4⅞" wide×6⅞" high, with a tapered tenon on each end. Posts 230 are formed with corresponding tapered mortises on their sides to receive the tapered tenons of the ends corresponding walkway portal 244. For example, and referring to the perspective shown in FIG. 10A, the tapered mortise on the right side of post A receives the tapered tenon from the adjacent walkway portal 244 extending between posts A and B. In some embodiments, the first walkways 232 in end rick modules 16 are wider than the first walkways 32, 132 and second walkways 36 shown in other rick modules 12, 14 (e.g., 3' 7¾" instead of 14"), and serve as evacuation routes.

In certain embodiments, the top of portal 244 includes a centered alignment hole and bottom plate 228 includes a corresponding centered alignment hole, such that when two end modules 16 are stacked atop each other, a worker may insert a rod through both alignment holes to confirm that the modules are aligned, before affixing the modules together using fasteners.

Figure 12:
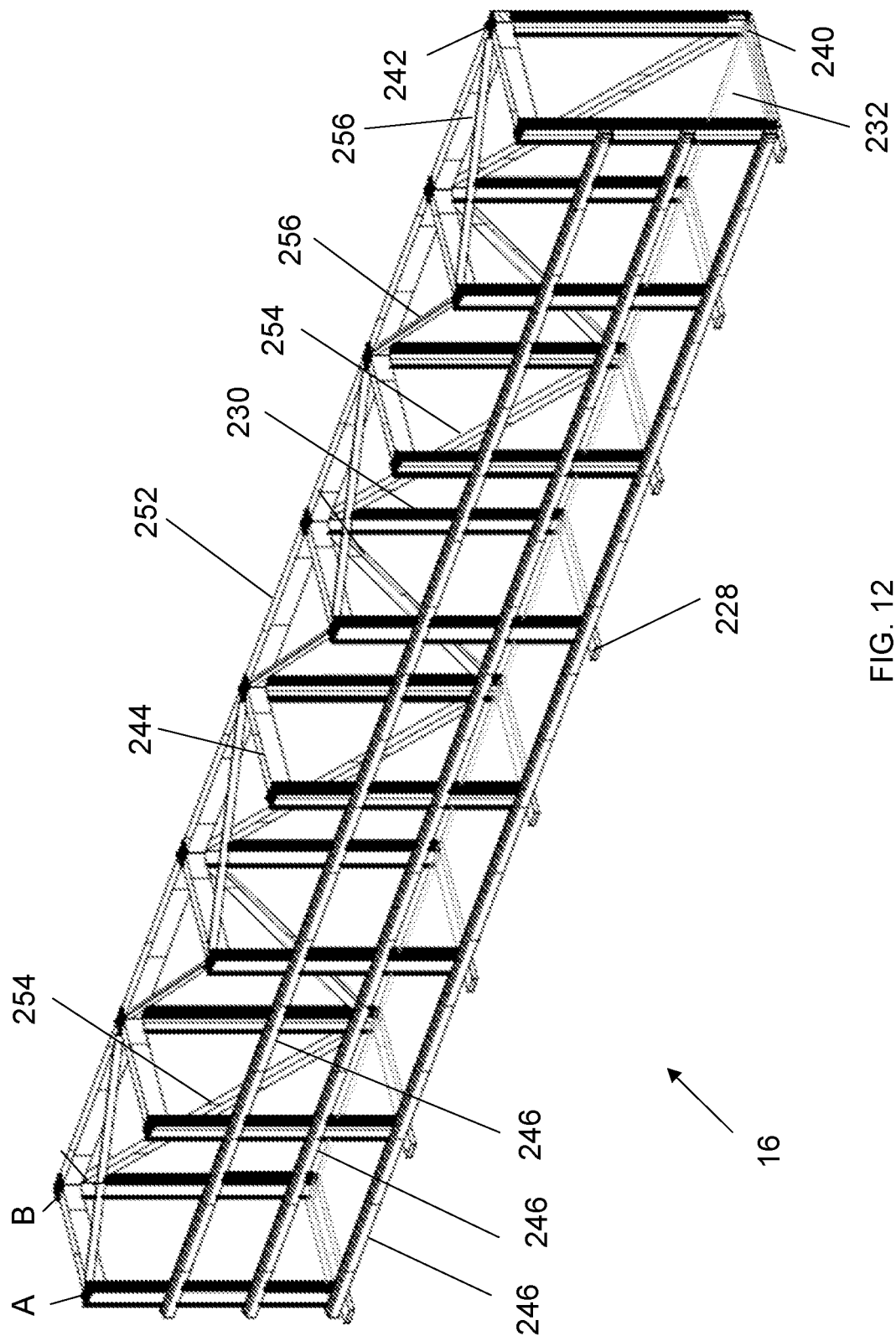
FIG. 12 depicts an isometric view of the end rick module.

As most readily seen in FIG. 12, the end rick module 16 includes a plurality of the bottom plate 228 and two post 230 configurations shown in FIGS. 10A and 10B, collectively referred to as a two post vertical post assembly or 2-VPA. In the depicted embodiment, the end rick module 16 includes eight 2-VPAs spaced 90" apart, although different embodiments may have different spacing or a different number of 2-VPAs in an end rick module 16. The spaced apart 2-VPAs are connected by dunnage 246. As shown in FIGS. 10A and 10B, dunnage 246 is affixed to the left side of post A. This arrangement provides for an unobstructed first walkway 232 between posts A and B while the dunnage 246 supports barrels 38 between post A and post D of an adjacent base rick module 12. In the depicted embodiment, three lengths of dunnage 246 are attached to each post A at three different heights, allowing for three rows of barrels 38 to be supported by the post 230. In preferred embodiments, the dunnage 246 is tapered on both its top and bottom surfaces to substantially match the taper of barrels 38 that will be rolled along and supported by the dunnage 246. In the event of damage to the top surface, the dunnage 246 may be removed from the post 230, rotated upside down, and reattached to the post 230, using the undamaged bottom surface as the top surface in this new orientation.

In some embodiments, holes are pre-drilled in post A at the desired height of the dunnage 246. In certain embodiments, the dunnage 246 is 4⅜" wide×5" high×53.5' long. In addition, a ¼" deep recess is formed in post A to receive a portion of the dunnage 246. The dunnage 246 is predrilled every 90" to match locations of the spaced apart 2-VPAs. The dunnage 246 is then inserted into the recess in post A, aligning the predrilled holes in the dunnage 246 with the pre-drilled holes in the post 230, and bolts are inserted through the post 230 and dunnage 246 to fasten them together.

In some embodiments, end rick modules 16 are configured to mechanically engage and form a portion of the structural support of end walls 20. In such embodiments, the right side of post B of end rick module 16 includes a ¼" deep recess located at a height to correspond with a 2'×4' wall purlin 250 in the end wall 20. When constructing the end walls 20 around the modular barrel storage system 10, wall purlins 250 in the end wall 20 will be partially inserted into these recesses in post A of end rick module 16 and fastened thereto to mechanically engage the end walls 20 to the modular storage system 10. End rick modules 16 further include horizontal beams 252 extending between the top ends 242 of successive posts B for additional stability. These horizontal beams 252 include tapered tenons configured to engage the tapered mortise on the front and rear of each post B, forming dovetail joints. In embodiments sized to fit end rick modules 16 with eight 2-VPAs, these horizontal beams 252 are 4⅞" by 6⅞" by 83⅛" long. For additional stability, first support bracing 254 extends from the bottom end 240 of one post B to the top end 242 of the successive post B in the end rick module 16. In other embodiments, first support bracing 254 may extend from the top end 242 of one post B to the bottom end 240 of the successive post B or other configuration. In some embodiments, this first support bracing 254 is 4"×4" glue-laminated Southern Yellow pine wood. In some embodiments, end rick modules 16 further include second support bracing 256 extending from the top end 242 of one post B to the top end 242 of the successive post A and/or from the top end 242 of one post A to the top end 242 of the successive post A in the end rick module 16.

Figure 11:
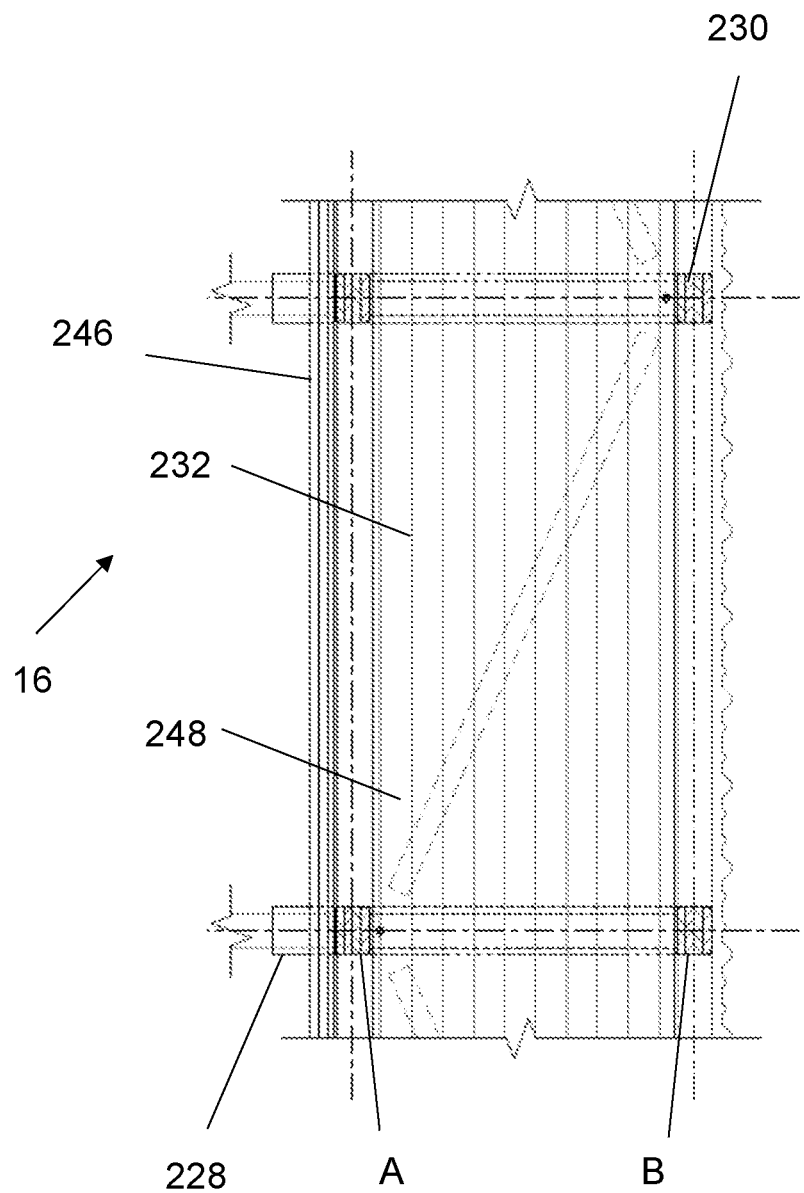
FIG. 11 depicts a cross-sectional top plan view of a portion of the end rick module along C-C of FIG. 10A.

As most readily seen in FIG. 11, end rick module 16 further includes walk boards 248 extending between successive bottom plates 228 in successive 2-VPAs between posts A and B (walk boards 48 are omitted from FIG. 12 for clarity). Walk boards 248 provide footing for workers along substantially the entire length of the end rick module 16. In some embodiments, each individual walk board 248 is approximately 90" in length and is fastened to successive bottom plates 228 by screws or other means as generally known in the art.

Figure 13:
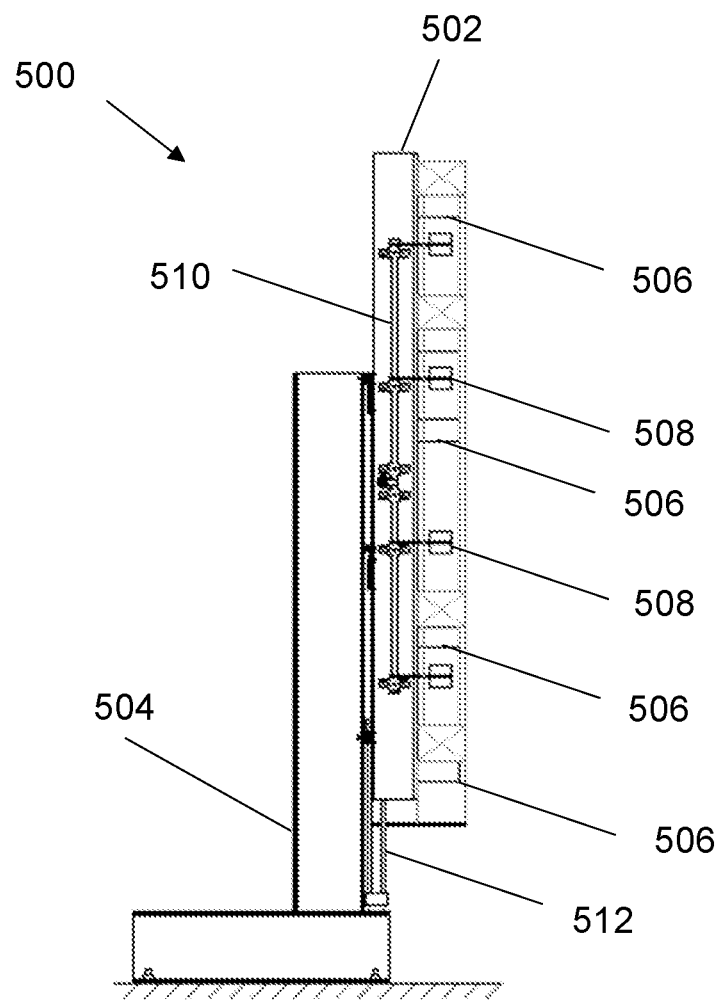
FIG. 13 depicts a side elevation view of a VPA assembly station with a 4-VPA carried thereon.

In some embodiments, an end rick module 16 with eight 2-VPAs, as shown in FIG. 13, is 5' 2½" wide, 7' 11" tall and 53' 6" long. The end rick module 16 is sized to be loaded on a flatbed trailer and transported to a construction site, and may be lifted by crane and set into place on a flooring or atop another aisle rick module. It should be understood that end rick modules 16 may be constructed with fewer than eight 2-VPAs.

In preferred embodiments, the posts 30, 130, 230 and dunnage 46, 146, 246 used with the various modules 12, 14, 16 all share the same dimensions and are interchangeable, simplifying the manufacturing and assembly process of the modular barrel storage system 10. Similarly, hallway portals 44, 144, barrel aisle portals 45, 145, and walk boards 48, 148 used with base rick modules 12 and aisle rick modules 14 are also interchangeable. In the embodiment described herein, end rick modules 16 use wider hallway portals 244 and walk board 248, but in other embodiments, end rick modules 16 may be constructed with hallway portals 244 and walk board 248 of the same dimensions as used in other rick modules 12, 14. In preferred embodiments, bottom plates 28, 128, 228 all share the same width and height and differ only in length. In some embodiments, each length of dunnage 46, 146, 246 is a single continuous piece, which results in stronger and straighter dunnage, allowing barrels to roll easier and straighter, reducing the risk of barrels falling off the dunnage.

VPA Assembly Station

Figure 14:
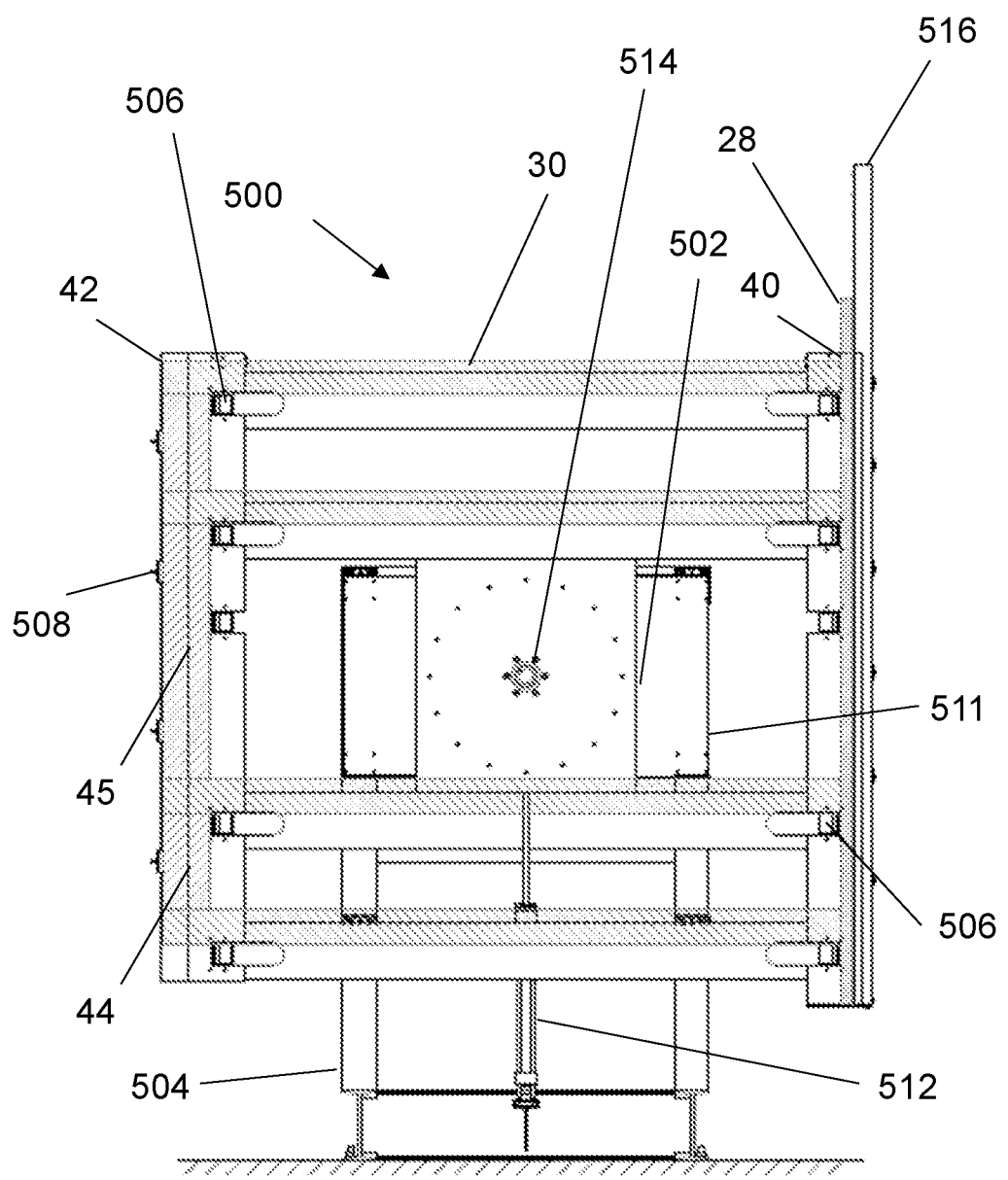
FIG. 14 depicts a front view of the VPA assembly station of FIG. 13.

In some embodiments, 2-VPAs, 3-VPAs, and 4-VPAs may be rapidly manufactured through use of a vertical post assembly station 500. Referring now to FIGS. 13 and 14, the assembly station 500 includes a rotatable fixture 502 for assembling posts 30, bottom plates 28, walkway portals 44 and barrel aisle portals 45. While the assembly station 500 is shown and described as facilitating the assembly of 4-VPAs, it should be understood that the assembly station 500 is equally suitable for facilitating the assembly of 2-VPAs and 3-VPAs. In manufacturing facilities designed to facilitate manufacture of modules 12, 14, 16 containing eight VPAs, eight assembly stations 500 will preferably be located in proximity to each other and operated simultaneously, such that all VPAs needed for a single module can be manufactured simultaneously.

The rotatable fixture 502 is rotatably mounted to a fixture base 504. The rotatable fixture 502 includes a plurality of arms 506 that may be positioned parallel to the rotatable fixture 502 for storage or perpendicular to the rotatable fixture 502 when in use. In use, the rotatable fixture 502 is initially rotated approximately 90 degrees from vertical, such that the 7'10" height of a post 30 mounted on the rotatable fixture will extend sideways (a shown in FIG. 14), providing easy access to the top end 42 and bottom end 40 of the post. In use, operators will place a bottom plate 28 on the fixture in a vertical orientation. Next, operators will load four posts 30 onto the arms 506, the arms 506 being positioned perpendicular to the rotatable fixture 502. As shown in FIG. 14, the arms 506 are vertically spaced apart on the rotatable fixture 502 as needed to accommodate portals 44, 45 therebetween. As should be understood, the assembly station 500 may facilitate assembly of a 2-VPA or 3-VPA by having operators simply load two or three posts onto the station and use a correspondingly shorter bottom plate. Once the posts 30 are in place, the operators will insert walkway portals 44 and a barrel aisle portal 45 between the posts 30 as described above. In this rotated orientation of the rotatable fixture, the various tenons and mortises on the portals 44, 45 and posts 30 are oriented vertically. The operators align the various tenons and mortises, then activate rotating clamps 508 powered by a clamp hydraulic cylinder 510, which rotate in an arc between an open position and a closed position to make contact with the portals. The clamps are shown in the closed position in FIGS. 13 and 14. These clamps 508 push until the tapered tenons of each portal 44, 45 are fully seated inside the mortises or channels of each post 30. While the clamps 508 remain in the closed position, the operators insert screws or other fasteners into pre-located, pre-drilled pilot holes that run at an angle from the portals 44, 45 to the posts 30 and to join the components together. The operators also apply screws or other fasteners from the bottom plate 28 into the bottom ends 40 of the posts 30. Pilot holes in the bottom plate 28 determine the location of the fasteners, while the number of posts 30 determines the quantity of the fasteners. After attaching the bottom plate 28 to the posts 30, the operators will feed pre-marked lag screws into pilot holes on the side of the posts 30. The lag screws are for the installation process on-site to fasten vertically stacked modules to each other. The pre-marking on the lag screw tells the operators how far to seat the screws for transportation. When this portion of the process is completed, the operators will activate a hydraulic lift cylinder 512 on each assembly station 500, lifting each rotatable fixture 502 approximately twenty inches vertically. At the end of this travel, another switch on the lift cylinder 512 will activate the hydraulic rotary actuator 514 to rotate 90 degrees, transitioning to the carried 4-VPA to an upright orientation. A V-profile bearing ring is mounted to the rotatable fixture and mating V-bearings are mounted to the fixture base 504. The grooved roller bearings that roll on the track profile of the combo are mounted to a moving plate 510 of the fixture base 504, the moving plate 510 being raised and lowered by the hydraulic cylinder 512. Once initiated, the actuator 514 will rotate the rotatable fixture 90 degrees, placing the VPAs assembled thereon in their correct vertical orientation. After rotating the correct distance, a switch (limit or proximity) will confirm correct position, stop the actuator 514 from rotating and switch the valve controlling the hydraulic cylinder 512 causing it to lower the fixture with the assembly on it. The lifting action is required to afford the rotatable fixture 502 and carried VPA space to clearing the floor during rotation. Assembling the posts 30, portals 44, 45 and bottom plates 28 in a horizontal orientation allows operators to easily reach both the top end 42 and bottom end 40 of the posts 30.

In some embodiments, the assembly station 500 includes a roller assembly 516 mounted to the rotatable fixture 502. When the rotatable fixture 502 is in an upright orientation, the roller assembly 516 serves as a shelf supporting the bottom plate 28 and the remainder of the VPA. In this orientation, the roller assembly 516 allows the VPA to be easily rolled off the assembly station 500. When the rotatable fixture 502 is in a horizontal orientation, as shown in FIGS. 13 and 14, the bottom plate 28 fits between the roller assembly 516 and posts 30 supported on arms 506.

In the preferred embodiment, where eight assembly stations 500 are arranged in parallel, the 8 VPAs once assembled and rotated such that the posts are upright, will each be moved from their respective assembly station along roller assembly 516 on rollers to a main assembly area where they are locked in place so that they are in linear alignment. Preferably there are dunnage support arms between the adjacent VPAs at the desired height. A dunnage feeder conveyor system will now be used to place dunnage in proper location for affixing to the posts as appropriate. Also, walk boards 48, or other items, can then be attached. The end result is that the dunnage attachment connects the eight separate 4-VPAs together into a single base rick module 12. After assembly, with the dunnage support arms removed from between the VPAs and the VPAs unlocked, the base rick module can be rolled off of the main assembly area for transport, storage, or other use, freeing up the main assembly area for assembly of the next module.

Reference systems that may be used herein can refer generally to various directions (e.g., top, bottom, leftward, rightward, forward and rearward), which are merely offered to assist the reader in understanding the various embodiments of the disclosure and are not to be interpreted as limiting.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

The invention claimed is:

1. A modular storage system for barrels, comprising: a plurality of modules, each module having a plurality of vertical post assemblies, each vertical post assembly having a bottom plate, the bottom plate having at least two posts attached thereto and extending upward therefrom, the at least two posts being in a parallel relationship, the at least two posts including two outer posts, the at least two posts each having a pair of channels therein located from the top of each post extending downward, the channels located on opposite sides of each post, the channels in the at least two posts being in alignment such that the channel in one post and the channel in another post which channels face each other receive the ends of a portal therein; the plurality of vertical post assemblies being spaced apart with their bottom plates in a parallel relationship with at least one post of each vertical post assembly having at least one dunnage member secured thereto, thereby securing the parallel relationship of the plurality of vertical post assemblies and thereby forming a module, at least one of the at least one dunnage member is secured to an outside face of one of the two outer posts which outside face faces away from all other posts attached to the bottom plate.

2. The modular storage system of claim 1, where the bottom plates of each of the plurality of vertical post assemblies are spaced an equal distance apart and have walk boards extending therealong between the two outer posts.

3. The modular storage system of claim 2, where the at least one dunnage member secured to an outside face of one of the two outer posts which faces away from all other posts comprises three dunnage members, the dunnage members being equally spaced from each other.

4. The modular storage system of claim 2, where each module includes eight vertical post assemblies.

5. A modular storage system for barrels, comprising: a plurality of modules, each module having a plurality of vertical post assemblies, each vertical post assembly having a bottom plate, the bottom plate having a first, second, and third post attached thereto and extending upward therefrom, the first, second, and third post being in a parallel relationship, the first and third posts being outer posts, the first, second, and third post each having a pair of channels therein located from the top of each post extending downward, the channels located on opposite sides of each post, the channels in the first, second, and third posts being in alignment such that the channel in one post and the channel in another post which channels face each other receive the ends of a portal therein; the plurality of vertical post assemblies being spaced apart with their bottom plates in a parallel relationship with at least one post of each vertical post assembly having at least one dunnage member secured thereto, thereby securing the parallel relationship of the plurality of vertical post assemblies and thereby forming a module, the at least one dunnage member comprises at least one set of dunnage members, each set including one dunnage member secured to the outside of the first post of each of the plurality of vertical post assemblies facing away from the second and third posts, another dunnage member secured to the inside of the second post of the plurality of vertical post assemblies facing toward the third post, and another dunnage member secured to the inside of the third post of the plurality of vertical post assemblies facing toward the second post, the set of dunnage members being at the same height above the bottom plates, the bottom plates of each of the plurality of vertical post assemblies being spaced an equal distance apart and having walk boards therealong between the first and second posts.

6. The modular storage system of claim 5, where the at least one set of dunnage members comprises three sets of dunnage members, the sets of dunnage members being equally spaced from each other along the posts.

7. The modular storage system of claim 5, where each module includes eight vertical post assemblies.

8. A modular storage system for barrels, comprising: a plurality of modules, each module having a plurality of vertical post assemblies, each vertical post assembly having a bottom plate, the bottom plate having a first, second, third, and fourth post attached thereto and extending upward therefrom, the first, second, third, and fourth posts being in a parallel relationship, the first and fourth posts being outer posts, the first, second, third, and fourth posts each having a pair of channels therein located from the top of each post extending downward, the channels located on opposite sides of each post, the channels in the first, second, third, and fourth posts being in alignment such that the channel in one post and the channel in another post which channels face each other receive the ends of a portal herein; the plurality of vertical post assemblies being spaced apart with their bottom plates in a parallel relationship with at least one post of each vertical post assembly having at least one dunnage member secured thereto, thereby securing the parallel relationship of the plurality of vertical post assemblies and thereby forming a module, the at least one dunnage member comprises at least one set of dunnage members, each set including one dunnage member secured to the outside of the first post of each of the plurality of vertical post assemblies facing away from the second, third, and fourth posts, another dunnage member secured to the inside of the second post of the plurality of vertical post assemblies facing toward the third post, another dunnage member secured to the inside of the third post of the plurality of vertical post assemblies facing toward the second post, and another dunnage member secured to the outside of the fourth post of the plurality of vertical post assemblies facing away from the first, second, and third posts, the set of dunnage members being at the same height above the bottom plates, the bottom plates of each of the plurality of vertical post assemblies being spaced an equal distance apart and having walk boards extending therealong between the first and second posts and the third and fourth posts.

9. The modular storage system of claim 8, where the at least one set of dunnage members comprises three sets of dunnage members, the sets of dunnage members being equally spaced from each other along the posts.

10. The modular storage system of claim 8, where each module includes eight vertical post assemblies.

11. The modular storage system of claim 6, where the second and third posts and the three sets of dunnage members are spaced such that a barrel can fit between the second and third posts and be supported along ends of the barrel by cooperating dunnage members on the second and third posts.

12. The modular storage system of claim 9, where the second and third posts and the three sets of dunnage members are spaced such that a barrel can fit between the second and third posts and be supported along ends of the barrel by cooperating dunnage members on the second and third posts.

13. The modular storage system of claim 12, where the plurality of modules includes at least a first module, a second module, and a third module, the first, second, and third modules being spaced adjacent to each other with the vertical post assemblies of the first second, and third modules being linearly aligned, the spacing between the modules being such that a barrel can fit between the fourth post of the first module and the first post of the second module and be supported by cooperating dunnage members on the fourth post and the first post, where facing channels in the fourth post and the first post receive the ends of a portal therein, the spacing between the modules further being such that a barrel can fit between the fourth post of the second module and the first post of the third module and be supported by cooperating dunnage members on the fourth post and the first post, where facing channels in the fourth post and the first post receive the ends of a portal therein, where the portals received in the facing channels mechanically engage the modules.

14. The modular storage system of claim 13, where each of the first, second, and third modules include eight vertical post assemblies.

15. The modular storage system of claim 1, where the plurality of modules includes: an end module, at least one base rick module, and an aisle module, the modules being aligned in a spaced side by side parallel relationship to form a rick storage unit, the corresponding bottom plates and vertical post assemblies of the modules being linearly aligned.

16. The modular storage system of claim 15, where:
a. the two outer posts of each vertical post assembly of the end module are a first and a second post, the at least one dunnage member of the end module secured to the side of the first post of each of the plurality of vertical post assemblies facing away from the second post, the bottom plates of each of the plurality of vertical post assemblies are spaced an equal distance apart and have walk boards extending therealong between the first and second posts;
b. each vertical post assembly of the at least one base rick module has a first, second, third, and fourth post, the at least one dunnage member of the base rick module comprises at least one set of dunnage members, each set including one dunnage member secured to the outside of the first post of each of the plurality of vertical post assemblies facing away from the second, third, and fourth posts, another dunnage member secured to the inside of the second post of the plurality of vertical post assemblies facing toward the third post, another dunnage member secured to the inside of the third post of the plurality of vertical post assemblies facing toward the second post, and another dunnage member secured to the outside of the fourth post of the plurality of vertical post assemblies facing away from the first, second, and third posts, the set of dunnage members being at the same height above the bottom plates, the spacing between the second and third posts being such that a barrel can be supported by the cooperating dunnage members on the second post and the third post, the bottom plates of each of the plurality of vertical post assemblies being spaced an equal distance apart and having walk boards extending therealong between the first and second posts and the third and fourth posts;
c. each vertical post assembly of the aisle module has a first, second, and third post, the at least one dunnage member of the aisle module comprises at least one set of dunnage members, each set including one dunnage member secured to the outside of the first post of each of the plurality of vertical post assemblies facing away from the second and third posts, another dunnage member secured to the inside of the second post of the plurality of vertical post assemblies facing toward the third post, and another dunnage member secured to the inside of the third post of the plurality of vertical post assemblies facing toward the second post, the set of dunnage members being at the same height above the bottom plates, the spacing between the second and third posts being such that a barrel can be supported by the cooperating dunnage members on the second post and the third post, the bottom plates of each of the plurality of vertical post assemblies being spaced an equal distance apart and having walk boards therealong between the first and second posts; and, d. where the end module is placed in a spaced relationship to the at least one base rick module on one side thereof and the aisle module is placed in a spaced relationship to the at least one base rick module on the other side thereof, the spacing between the modules being such that a barrel can fit between the first post of the end module and the first post of the base rick module and be supported by the cooperating dunnage members on the first posts, where facing channels in these posts receive the ends of a portal therein, the spacing between the modules further being such that a barrel can fit between the fourth post of the at least one base rick module and the first post of the aisle module and be supported by cooperating dunnage members on the fourth post and the first post, where facing channels in the fourth post and the first post receive the ends of a portal therein, where the portals received in the facing channels mechanically engages the modules.

17. The modular storage system of claim 16, where the rick storage unit has at least one additional identical rick storage unit placed on top of the rick storage unit and secured thereto, where the corresponding base plates of each vertical post assembly are received atop the posts of the corresponding vertical post assembly therebelow such that the posts of the vertical post assemblies on top are in vertical alignment with the posts of the vertical post assemblies therebelow.

18. The modular storage system of claim 16, where the rick storage unit has at least one additional rick storage unit placed to a side of the rick storage unit to form side by side rick storage units such that there is a center aisle therebetween, where tenons in the vertical post assemblies adjacent the center aisle in each rick storage unit have channels therein from their top downward, the channels facing each other across the center aisle receiving a tie beam therein, thereby mechanically engaging the rick storage units.

19. The modular storage system of claim 16, where the rick storage unit has an additional rick storage unit placed such that the aisle module of the rick storage unit and the aisle module of the additional rick storage unit face each other in a spaced relationship such that an aisle is formed therebetween, the channels in the corresponding post of the aisle module in the rick storage unit and the post of the aisle module in the additional rick storage unit each receiving a portal therein.

20. The modular storage system of claim 18, where the side by side rick storage units with the center aisle therebetween have additional rick storage units placed such that the aisle modules of the side by side rick storage units and the aisle modules of the additional rick storage units face each other in a spaced relationship such that an aisle is formed therebetween, the channels in the corresponding post of the aisle modules in the side by side rick storage units and the post of the aisle module in the additional rick storage units each receiving a portal therein, the additional rick storage units also placed so as to extend the center aisle, where tenons in the vertical post assemblies of the modules of the additional rick storage units adjacent the center aisle in each rick storage unit also have channels therein from their top downward, the channels facing each other across the center aisle also receiving a tie beam therein.

\* \* \* \* \*